(12) United States Patent
Stroot et al.

(10) Patent No.: US 8,545,700 B1
(45) Date of Patent: Oct. 1, 2013

(54) REDUCTION AND CONTROL OF PH AND SOLUBLE $CO_2$ FOR OPTIMAL NITRIFICATION OF WASTEWATER

(75) Inventors: Peter George Stroot, Lutz, FL (US); Raymond Anthony Morris, Lakeland, FL (US)

(73) Assignee: University of South Florida, Tampa, FL (US)

( * ) Notice: Subject to any disclaimer, the term of this patent is extended or adjusted under 35 U.S.C. 154(b) by 648 days.

(21) Appl. No.: 12/711,525

(22) Filed: Feb. 24, 2010

Related U.S. Application Data

(60) Provisional application No. 61/154,811, filed on Feb. 24, 2009.

(51) Int. Cl.
*C02F 3/00* (2006.01)
(52) U.S. Cl.
USPC ............ 210/614; 210/615; 210/622; 210/631
(58) Field of Classification Search
USPC .................................. 210/614, 615, 622, 631
See application file for complete search history.

(56) References Cited

U.S. PATENT DOCUMENTS

| | | | |
|---|---|---|---|
| 5,863,435 A | 1/1999 | Heijnen et al. | |
| 6,444,124 B1 | 9/2002 | Onyeche et al. | |
| 7,001,519 B2 | 2/2006 | Linden et al. | |
| 2005/0218074 A1 | 10/2005 | Pollock | |
| 2007/0163952 A1 | 7/2007 | Schreier et al. | |

OTHER PUBLICATIONS

Siripong et al., Diversity Study of Nitrifying Bacteria in Full-Scale Municipal Wastewater Treatment Plants, Water Research, 2007, vol. 41, pp. 1110-1120.

Wagner et al., In Situ Analysis of Nitrifying Bacteria in Sewage Treatment Plants, Wat. Sci. Tech., 1996, vol. 34, No. 1-2, pp. 237-244.
Van Dongen et al., The SHARON(R) -Anammox(R) Process for Treatment of Ammonium Rich Wastewater, Water Science and Technology, 2001, vol. 44, No. 1, pp. 153-160.
Wett et al., The Role of Inorganic Carbon Limitation in Biological Nitrogen Removal of Extremely Ammonia Concentrated Wastewater, Water Research, 2003, vol. 37, pp. 1100-1110.
Van Hulle et al., Influence of Temperature and pH on the Kinetics of the SHARON Nitration Process, Journal of Chemical Technology and Biotechnology, 2007, vol. 82, No. 5, pp. 471-480.
Vazquez-Padin et al., Applications of Anammox Based Processes to Treat Anaerobic Digester Supernatant at Room Temperature, Bioresource Technology, 2009, vol. 100, pp. 2988-2994.

(Continued)

*Primary Examiner* — Chester Barry
(74) *Attorney, Agent, or Firm* — Robert J. Varkonyi; Smith & Hopen, P.A.

(57) ABSTRACT

The invention includes a method for the optimization of the soluble $CO_2$ concentration in the aeration basin of an activated sludge system, which significantly improves the specific growth rate of the nitrifying bacteria. The result is a reduction in capital and energy costs for municipalities. The rate of nitrification is a product of the nitrifying bacteria biomass concentration and the specific growth rate of the bacteria. In the activated sludge system, the biomass concentration is maintained at high concentrations by reducing the wasting rate. The specific growth rate is a function of the ammonium concentration and the environmental conditions. Here, the inventors show that growth of nitrifying bacteria is inhibited when the soluble $CO_2$ concentration is elevated beyond certain parameters. Elevated soluble $CO_2$ concentration also reduces the pH, which also impacts the rate of growth of nitrifying bacteria.

14 Claims, 17 Drawing Sheets

(56) References Cited

OTHER PUBLICATIONS

Daims et al., In Situ Characterization of Nitrospira-Like Nitrite-Oxidizing Bacteria Active in Wastewater Treatment Plants, Applied and Environmental Microbiology, 2001, vol. 67, No. 11, pp. 5273-5284.

Green et al., The Effect of CO2 Concentration on a Nitrifying Chalk Reactor, Water Research, 2002, vol. 36, pp. 2147-2151.

De Los Reyes et al., Group-Specific Small-Subunit rRNA Hybridization Probes to Characterize Filamentous Foaming in Activated Sludge Systems, Applied and Environmental Microbiology, 1997, vol. 63, No. 3, pp. 1107-1117.

Mobarry et al., Phylogenetic Probes for Analyzing Abundance and Spatial Organization of Nitrifying Bacteria, Applied and Environmental Microbiology, 1996, vol. 62, No. 6, pp. 2156-2162.

Denecke et al., Effect of Carbon Dioxide on Nitrification Rates, Bioprocess. Biosyst. Eng., 2003, vol. 25, pp. 249-253.

Melcer et al., Methods for Wastewater Characterization in Activated Sludge Modeling, Water Environment Research Foundation, 2003, IWA Publishing.

Dagley et al., Physicochemical Aspects of Bacterial Growth. Part II. Quantitative Dependence of the Growth Rate of Bact. Lactis Aerogenes on the Carbon Dioxide Content of the Gas Atmosphere, J. Chem. Soc., 1938, pp. 1936-1942.

Jeyanayagam, True Confessions of the Biological Nutrient Removal Process, Florida Water Resources Journal, 2005, pp. 37-46.

Metcalf et al., Wastewater Engineering Treatment and Reuse, 2003, McGraw-Hill, New York, New York.

Model when Substrate is Inhibitory. http://www.rpi.edu/dept/chem-eng/biotech-Environ/GrowPresent/inhib.htm. Accessed on Feb. 8, 2013.

US 8,545,700 B1

REDUCTION AND CONTROL OF PH AND SOLUBLE CO$_2$ FOR OPTIMAL NITRIFICATION OF WASTEWATER

CROSS REFERENCE TO RELATED APPLICATIONS

This application is a Non-Provisional Application of co-pending U.S. Provisional Application No. 61/154,811 filed Feb. 24, 2009, which is incorporated herein by reference.

FIELD OF INVENTION

This invention relates to methods of treating wastewater.

BACKGROUND OF THE INVENTION

Nitrification is the first step for the removal of nitrogen from wastewater, where ammonium ($NH_4^+$) is oxidized to nitrate ($NO_3^-$) by aerobic, autotrophic, nitrifying bacteria. These bacteria are thought to have slow growth rates and are sensitive to pH and temperature swings, making nitrification difficult to maintain in activated sludge systems (Mobarry et al. 1996; Wagner et al. 1996). The slow growth rate and associated nitrification rate requires a lengthy solids retention time (SRT), as much as 20 days. Previous work has demonstrated that the growth of some autotrophic bacteria is carbon limited (Dagley and Hinshelwood 1938; Green et al. 2002; Denecke and Liebig 2003). Inorganic carbon was found to be a limiting factor in biological nutrient removal (BNR) systems due to the low partial pressure of carbon dioxide ($pCO_2$) of the atmospheric air introduced, and the loss of $CO_2$ by stripping (Wett and Rauch 2003). These factors were reported to limit the bulk concentration of $CO_2$ in wastewater and consequently affect nitrification.

The art lacks, however, an evaluation of the effect of elevated $pCO_2$ on the specific growth rate of nitrifying bacteria using activated sludge from three different types of BNR processes: extended-aeration, Modified Ludzack-Ettinger (MLE), and Bardenpho.

SUMMARY OF INVENTION

The rate of nitrification is a product of the nitrifying bacteria biomass concentration and the specific growth rate of the bacteria. In the activated sludge system, the biomass concentration is maintained at high concentrations by reducing the wasting rate. The specific growth rate is a function of the ammonium concentration and the environmental conditions. Traditionally, the specific growth rate has been improved by increasing the dissolved oxygen concentration through the use of higher aeration rates and fine bubble diffusers. The concentration of the soluble carbon dioxide ($CO_2$) has been overlooked as a controllable parameter of importance for the growth of these autotrophic bacteria. It has been assumed that the soluble $CO_2$ concentration in aeration basins is non-limiting. Here, the inventors show that growth of nitrifying bacteria is inhibited when the soluble $CO_2$ concentration is elevated beyond certain parameters. Elevated soluble $CO_2$ concentration also reduces the pH, which also impacts the rate of growth of nitrifying bacteria. The invention therefore includes a method for the optimization of the soluble $CO_2$ concentration in the aeration basin which significantly improves the specific growth rate of the nitrifying bacteria. The result is a reduction in capital and energy costs for municipalities.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Biological ammonia removal in wastewater treatment plants is a slow process. This invention is the first to treat the dissolved $CO_2$ concentration and pH as important parameters in optimizing the specific growth rate of nitrifying bacteria. Five wastewater treatment plants (WWTP) representing the three major plant configurations, (1) extended aeration (EA), (2) Modified Ludzack-Ettinger (MLE), and (3) Bardenpho, were evaluated based upon their operating conditions and activated sludge properties. The specific growth rates of the nitrifying bacteria were calculated for field and optimal conditions for pH and dissolved $CO_2$ concentrations and suggest potential for improvement. Evaluation of nitrification in activated sludge at defined dissolved $CO_2$ concentrations and constant pH 7 verified these findings. Fluorescence in situ hybridizations (FISH) were used to determine the abundance of nitrifying bacteria populations in the activated sludge from each WWTP and lab-scale reactors. Changes in the community structure of the nitrifying bacteria demonstrate sensitivity to dissolved $CO_2$.

An important finding of this work is the high concentration of dissolved $CO_2$ in the aeration basins and other unit processes. Significant differences are evident and upon investigation are quite plausible. As an example, the aeration system on an MLE process uses three anoxic and four aerobic zones in a carousel arrangement to convert BOD and ammonia. A mixture of influent, RAS, and internal recycle from the aeration basin enter the anoxic basin, where denitrification generates additional dissolved $CO_2$ as a by-product. This treated wastewater with a high level of dissolved $CO_2$ then flows into the aeration basin where additional dissolved $CO_2$ is generated with minimal stripping. Evidence of the impact of anoxic treatment and minimal $CO_2$ stripping are observed in the MLE and Bardenpho systems. Plant influent also impacts the dissolved $CO_2$ concentration in the aeration basin and appears to be a function of the influent quality and collection system. Finally, the dissolved $CO_2$ concentration in the effluent is much higher than expected, when you consider that water in equilibrium with the atmosphere has a $CO_2$ concentration of 0.6 mg/L. It is unknown whether this elevated dissolved $CO_2$ concentration negatively impacts receiving water by providing a carbon source for the growth of algae and cyanobacteria.

Figure 1:
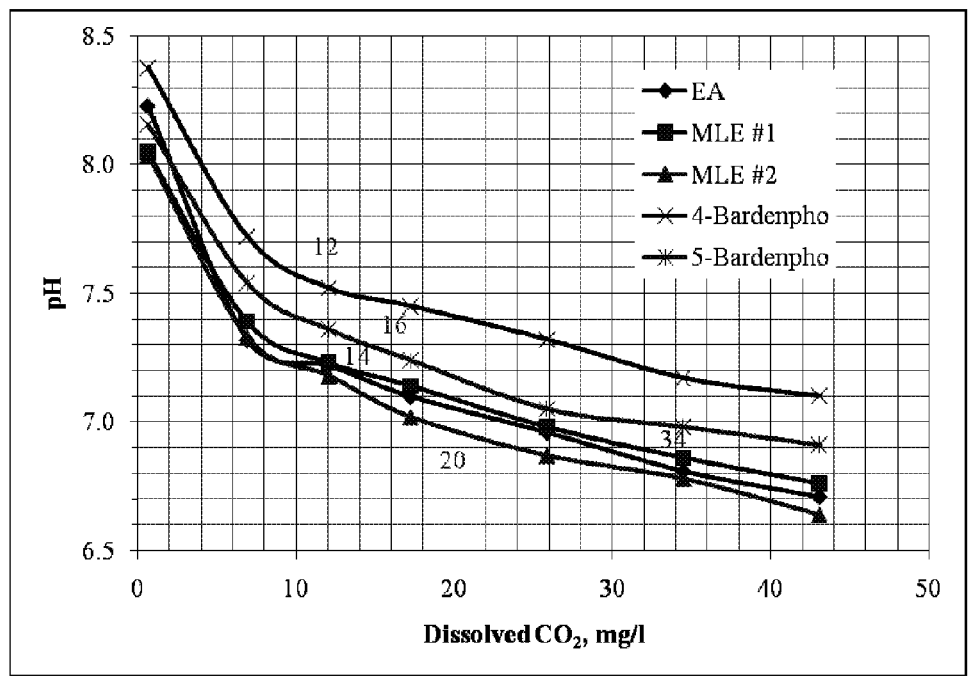
FIG. 1: Effect of dissolved $CO_2$ concentrations on pH. Numbers indicate the dissolved $CO_2$ concentration of the aeration basin.

Evaluation of the activated sludge from the WWTPs with Extended Aeration and MLE #1 showed differences in the specific growth rates of the nitrifying bacteria when the dissolved $CO_2$ concentration was optimized. The EA facility achieved a maximum growth rate at 7 mg/L $CO_2$ while the MLE #1 facility achieved a maximum growth rate at 12 mg/L, which are both near the optimal dissolved $CO_2$ concentration reported previously (Denecke and Liebig 2003). The community structure of the nitrifying bacteria in the activated sludge is expected to have a significant influence on the optimal dissolved $CO_2$ concentration. It should be noted that pH was held constant at 7 and optimization of the dissolved $CO_2$ concentration will increase the pH (FIG. 1).

The FISH results indicate differences in the community structure of the nitrifying bacteria amongst the WWTPs. Each facility appears to have its own established community of nitrifying bacteria. These results show that several AOB and NOB bacteria coexist in the same system, which is similar to a previous study (Siripong and Rittmann 2007). The four stage Bardenpho process, which operates near the ideal dissolved $CO_2$ concentration, shows a dominance of one AOB (*Nitrosospira* spp.) and NOB (phylum *Nitrospirae*). Due to its long SRT of nearly 26 days, the presence of other microbes is not unexpected. This suggests that as a process approaches the ideal dissolved $CO_2$ concentration for the growth of nitrifying bacteria, the community structure may becomes less diverse.

The differences in the observed presence of microbes among the WWTPs as seen in the FISH analysis (see Example V, Table 11) have one distinct possible cause. The community structure of the nitrifying bacteria may simply be different due to the influent variability. This is evident in observing the differences in the contribution of domestic wastewater in the influent between the plants. MLE #1 and MLE #2 have distinct variability in their AOB and NOB concentrations despite having essentially the same configuration and operational parameters. MLE #1 has a very low contribution of industrial wastewater, but is more diverse in the type of industrial wastewater it receives. MLE #2 has a large contribution of industrial wastewater, but consists mainly of wastewater from food processors as indicated by the high average BOD concentration.

FISH was used to investigate the nitrifying bacteria in lab-scale bioreactor experiments, which were conducted at dissolved $CO_2$ concentrations of 12 and 103 mg/L at a pH of 7.0. Compared to the seed material (MLE #1), the community structure of the nitrifying bacteria changed dramatically in unanticipated ways. Surprisingly, similar levels of *Nitrosomonas* spp. and *Nitrospirae* members were observed for both extreme dissolved $CO_2$ concentrations. However, levels of *Nitrosospira* spp. were much greater for the optimal dissolved $CO_2$ concentration and levels of *Nitrobacter* spp. were much greater for the suboptimal dissolved $CO_2$ concentration. In our attempts to provide optimal conditions for nitrification for the MLE #1 sludge, we were unable to produce a community structure of the nitrifying bacteria that was similar to the 4-stage Bardenpho. There may be several explanations for this failure. First, failure may be attributed to vastly different nitrifying bacteria in both samples, which would make it impossible to achieve this dominance of AOB and NOB populations present in the 4-stage Bardenpho. Second, it may be due to a lack of a wasting operation, which would remove slow-growing nitrifying bacteria. Third, we may be underestimating the difference in the effect of the influent wastewater properties. Fourth, we may be experiencing a pH effect, since the ideal dissolved $CO_2$ concentration increases the pH of the activated sludge to 7.56, which is more than half a pH unit above the lab-scale bioreactor experiment.

Methods to Implement in Full-Scale

Several methods exist to transform these findings into a technology for full-scale implementation. In most cases, the dissolved $CO_2$ concentration of the wastewater influent will need to be adjusted prior to pH adjustment and subsequent treatment in the aeration basin. The dissolved $CO_2$ concentration of the wastewater can be achieved by stripping the dissolved $CO_2$ from the influent or primary effluent. The pH can be adjusted through the addition of a strong base to all or a portion of the wastewater prior to treatment in the aeration basin. If the dissolved $CO_2$ concentration is too low in the aeration basin due to excessive stripping or transformation of dissolved $CO_2$ to the bicarbonate ion from base addition, the $CO_2$-enriched air stripped from the wastewater can be used as a source of $CO_2$ in the aeration system utilized in the aeration basin. Probes that measure the dissolved $CO_2$ concentration and pH can be positioned throughout the aeration basin to ensure optimal conditions for nitrification.

It is possible that higher rates of aeration in the aeration basin could reduce the soluble $CO_2$. Instead, a more cost effective means is the use of a $CO_2$ stripping stage to optimize the soluble $CO_2$ concentration for nitrification. Examples of such $CO_2$ stripping stages are air stripping towers and trickling filters.

A typical air stripping tower is a column equipped with a blower at the bottom of the column. The air stripping tower is vented to allow air and contaminants to vent to the outside. The blower blows air upward and the air removes the contaminants, here $CO_2$, from the water column. The upward air flow carries the $CO_2$ out the venting system. The air stripping tower can be filled with packing media as in a packed column. Therefore, the air stripping tower removes contaminants from water by cascading the water over a packing material designed to uniformly disperse the water throughout the tower while providing an upward flow of air which is also designed to uniformly disperse the water throughout the tower as well as provide a supply of air into which the contaminants may dissipate.

The conventional trickling filter utilizes a film of biomass fixed on a media to remove and aerobically convert organic matter to carbon dioxide, water and additional biomass and to oxidize ammonia to nitrates. The fixed media generally consists of rock, plastic or wood. Wastewater is distributed over the biomass fixed to media through an overhead rotary distributor having generally two to four nozzled arms or spreaders. This insures a relatively even distribution of wastewater over the fixed biomass and thereby produces a relatively constant loading throughout the filter area.

These technologies have been developed by the chemical and wastewater treatment industries. Traditionally, the air stripping tower has been utilized for high mass transfer rates of volatile organic compounds, while the trickling filter has been used as a fixed-film biological process for polishing secondary effluent. However, these technologies have not been employed for removal of soluble $CO_2$ for the express purpose of improving nitrification.

Figure 2:
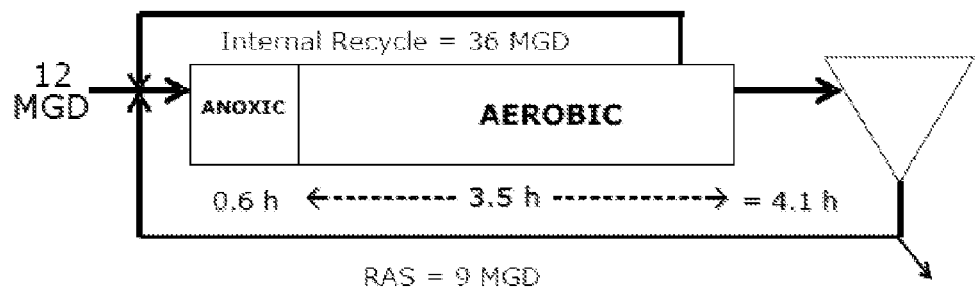
FIG. 2. Basic schematic of an illustrative WWTP utilizing the MLE Process. The WWTP treats 12 MGD (Q) and is comprised of 3 parallel anoxic tanks and 6 parallel aeration basins (FIG. 3). Each aeration basin is 60 feet wide, 180 feet long and 15 feet deep. Aeration of 1,000-1,500 SCFM in these basins provides adequate dissolved oxygen levels of 3 mg/L across the entire length. The average MLVSS is 2,450 mg/L.
Figure 3:
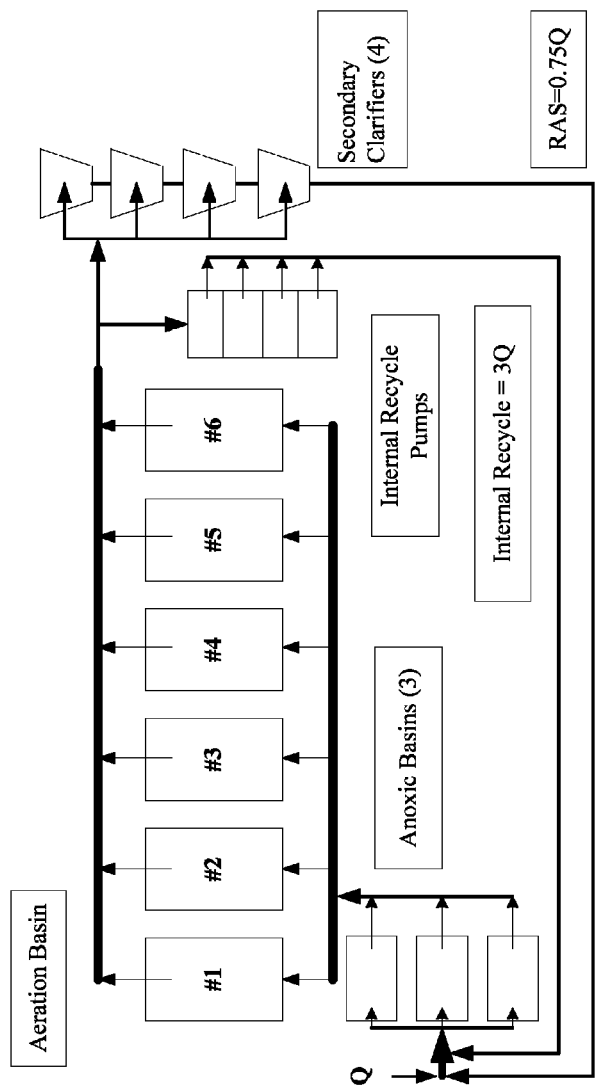
FIG. 3. Illustrative WWTP utilizing the MLE Process.

For MLE facilities (examples of which are shown in FIGS. 2 and 3), either technology could be used to process the internal recycle flow or the wastewater entering the aeration basin. The internal recycle flow rate is three times the influent wastewater flow rate and is used to provide a nitrate rich wastewater to the anoxic basin for denitrification. Either technology would reduce the soluble $CO_2$ levels, but would increase the dissolved oxygen content, which may inhibit denitrification in the anoxic tank and reduce performance.

Figure 4:
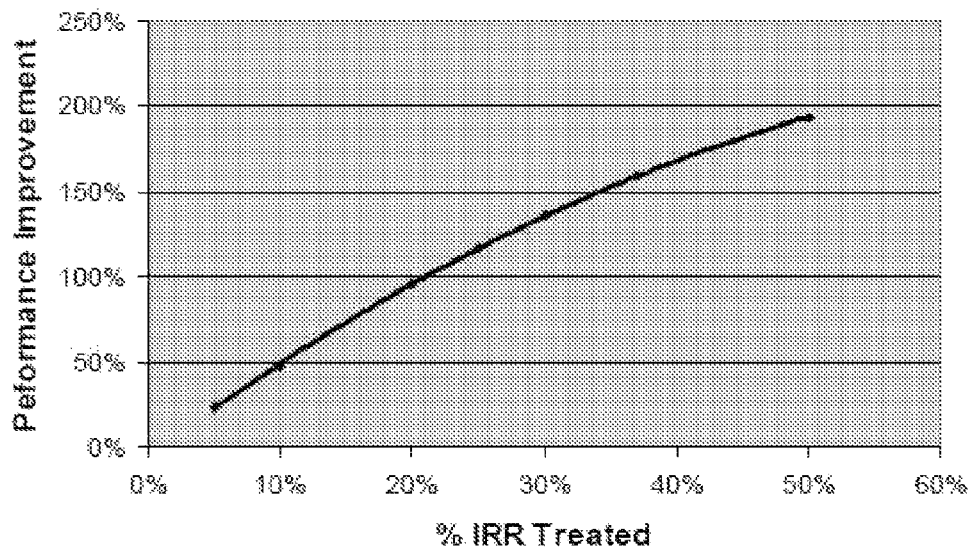
FIG. 4. Improvement in the specific growth rate of nitrifying bacteria as a function of the percent of the internal recycle flow treated through an air stripping technology.

When an increasing fraction of the internal recycle flow rate is treated by either technology, the soluble $CO_2$ concentration approaches the optimal $CO_2$ concentration for nitrification, as shown in FIG. 4. It is estimated that treatment of more than 50% of the internal recycle flow rate will yield no additional benefit with respect to the rate of nitrification.

Figure 5:
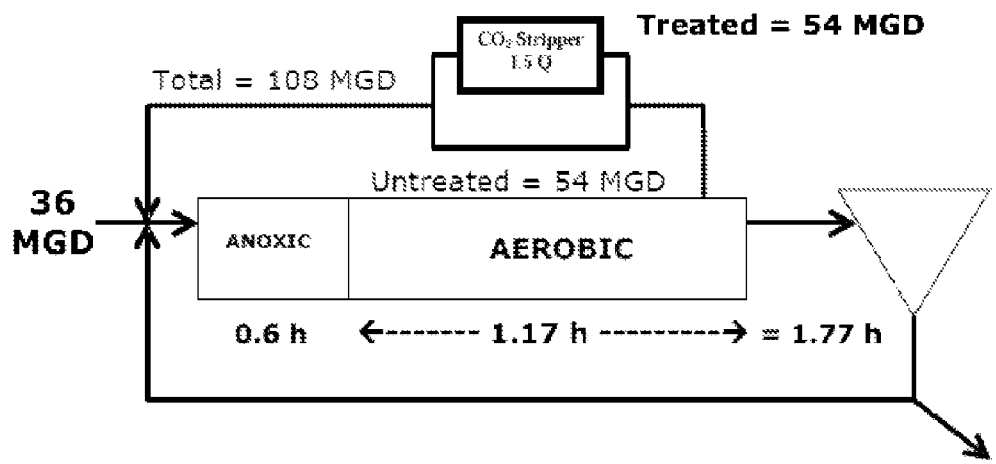
FIG. 5. Proposed retrofit of WWTP (FIG. 2) utilizing the MLE Process with air stripping technology to reduce soluble CO2 of the internal recycle wastewater.
Figure 6:
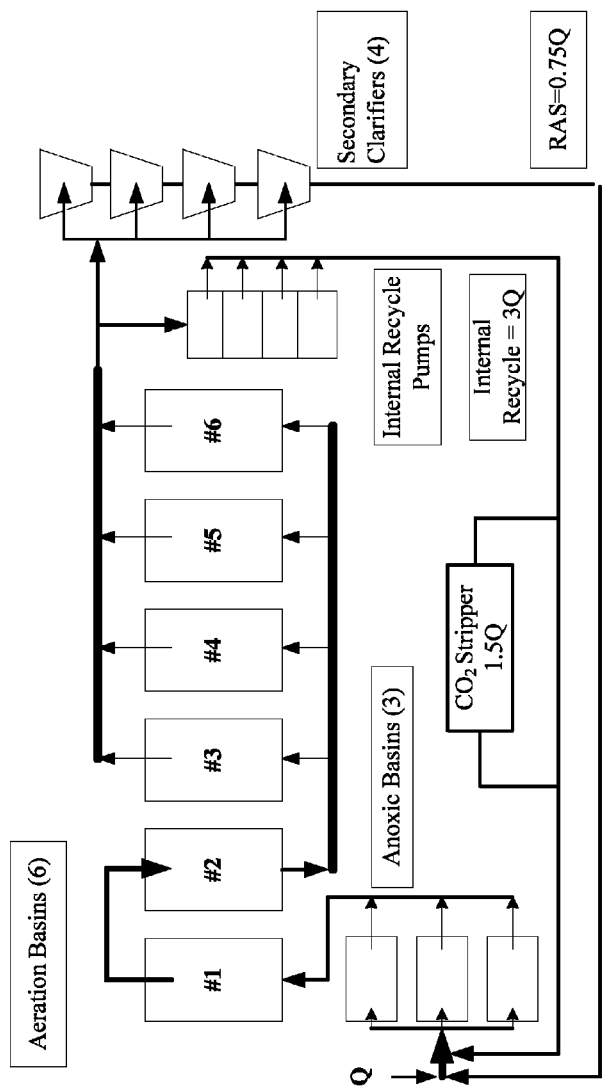
FIG. 6. Proposed retrofit of WWTP (FIG. 3) utilizing the MLE Process with CO2 stripping technology to reduce soluble CO2 of 50% of the internal recycle wastewater.

If the air stripping technology is used for reducing and optimizing the soluble $CO_2$ concentration in the aeration basin, then the nitrification rate will allow for a 67% reduction in the hydraulic retention time in the aeration basin (FIG. 5) and tripling of the influent wastewater flow rate. In this configuration, solids removal of the internal recycle wastewater is assumed to be not necessary for $CO_2$ stripping. Additional capacity for anoxic treatment, secondary clarifier, and internal recycle pumps may be required (FIG. 6). Additional anoxic treatment capacity is possible by reducing the aeration rate in Aeration Basin #1. Enhanced aeration would be required in Aeration Basin #2 to provide adequate dissolved oxygen for carbonaceous BOD removal.

Figure 7:
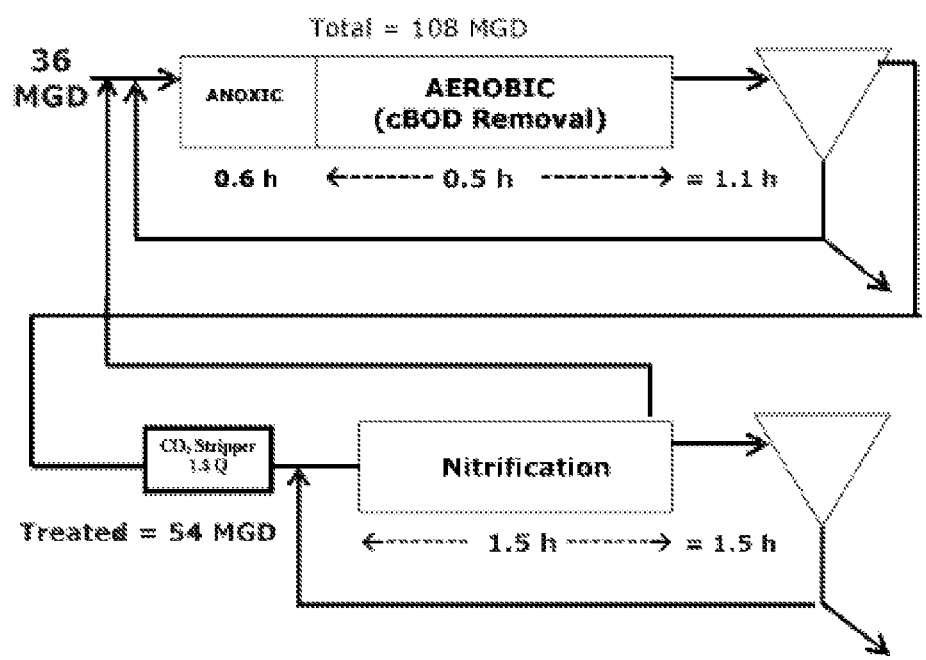
FIG. 7. Proposed retrofit of WWTP (FIG. 2) utilizing the MLE Process with CO2 stripping technology to reduce soluble CO2 of the wastewater entering the Nitrification train. The nitrate rich treated wastewater is internally recycled to the anoxic basin for denitrification.

In another approach to optimizing the soluble $CO_2$ concentration, a separate nitrification treatment train, the existing aeration basins and secondary clarifiers are split into two serial activated sludge systems (FIG. 7). The first activated sludge system is operated for removal of cBOD, while the second activated sludge system is operated for nitrification. The cBOD treatment train requires a short HRT, which would be ideal for the retrofit of POTW with multiple aeration basins being operated in parallel. For example, some facilities operate six parallel aeration basins and three secondary clarifiers. In this approach, the $CO_2$ stripping technology could be used to treat the effluent from the secondary clarifier of the cBOD removal system.

In this configuration, solids removal of the internal recycle flow is necessary for $CO_2$ stripping. Enhanced aeration is required in the first train to provide adequate dissolved oxygen for cBOD removal.

Figure 8:
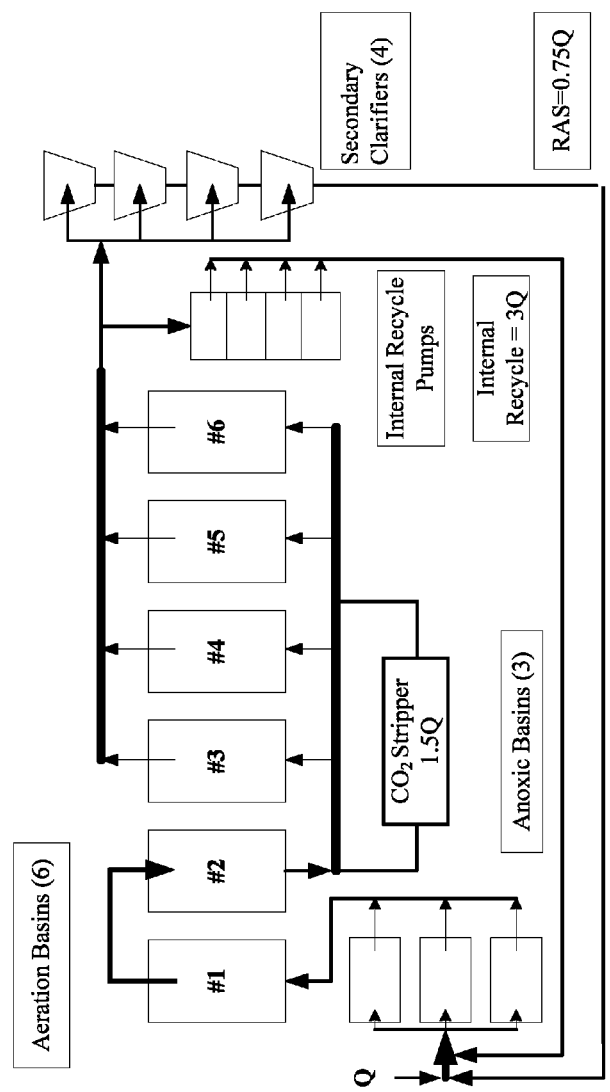
FIG. 8. Proposed retrofit of WWTP (FIG. 3) utilizing the MLE Process with CO2 stripping technology to reduce soluble CO2 of 50% of the wastewater exiting the aeration basin #2.
Figure 9A:
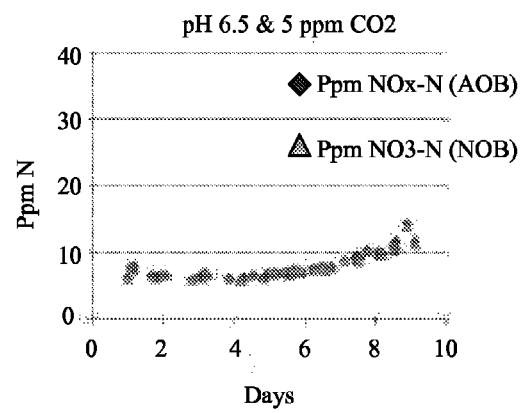
FIGS. 9A-D. Plots of $NO_x$ ($NO_2^-$—N+$NO_3^-$N; dark gray diamond) and $NO_3^-$N (light grey triangle), which correspond to the growth of ammonium oxidizing bacteria (AOB) and nitrite oxidizing bacteria (NOB), respectively, for MLE#1 activated sludge and a range of dissolved $CO_2$ concentrations (5 mg/L) and pH (6.5, 7.0, 7.5, and 8.0).
Figure 9B:
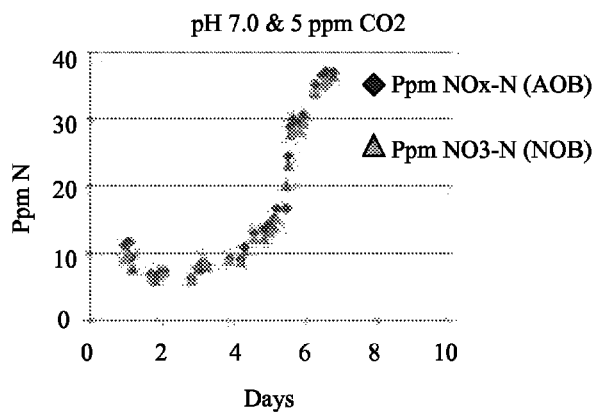
Figure 9C:
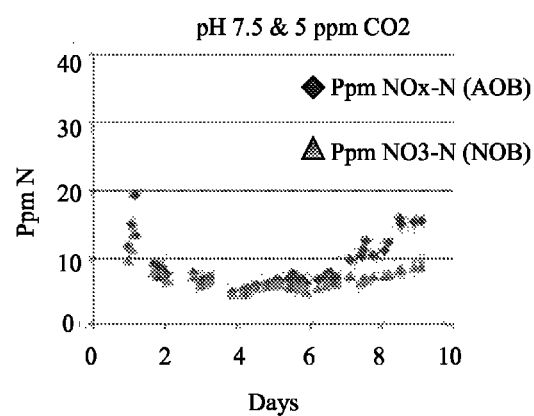
Figure 9D:
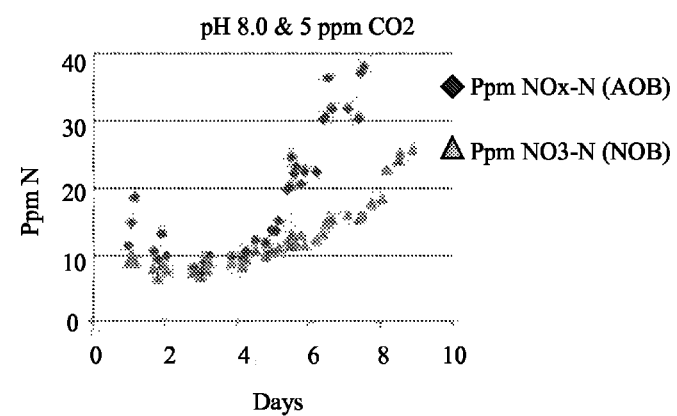
Figure 10A:
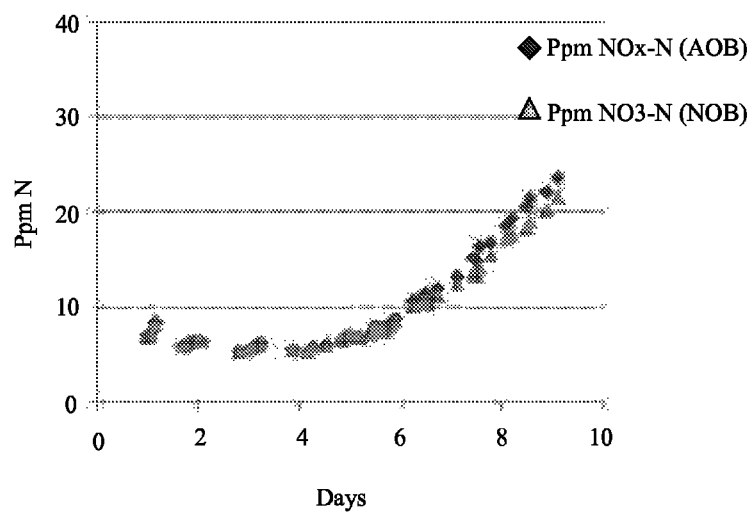
FIGS. 10A-D. Plots of $NO_x$ ($NO_2^-$—N+$NO_3^-$N; blue) and $NO_3^-$N (green), which correspond to the growth of ammonium oxidizing bacteria (AOB) and nitrite oxidizing bacteria (NOB), respectively, for MLE#1 activated sludge and a range of dissolved $CO_2$ concentrations (10 mg/L) and pH (6.5, 7.0, 7.5, and 8.0).
Figure 10B:
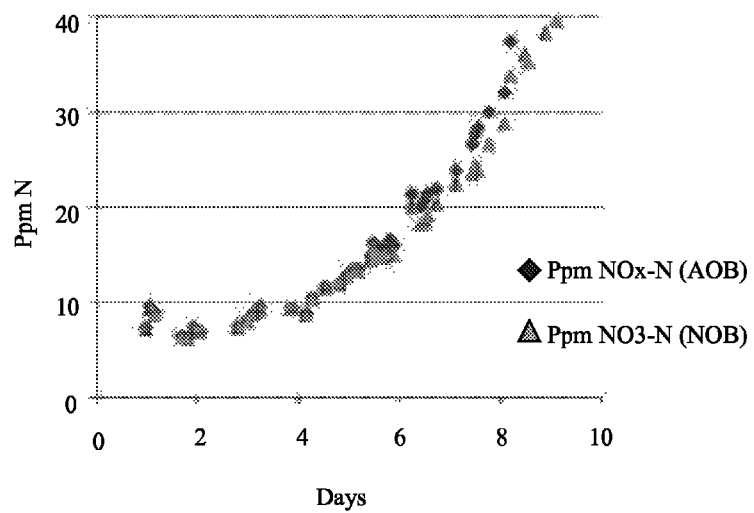
Figure 10C:
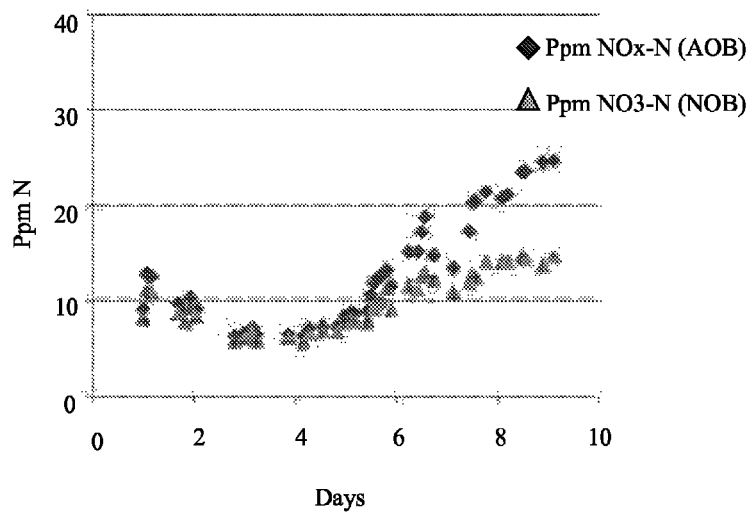
Figure 10D:
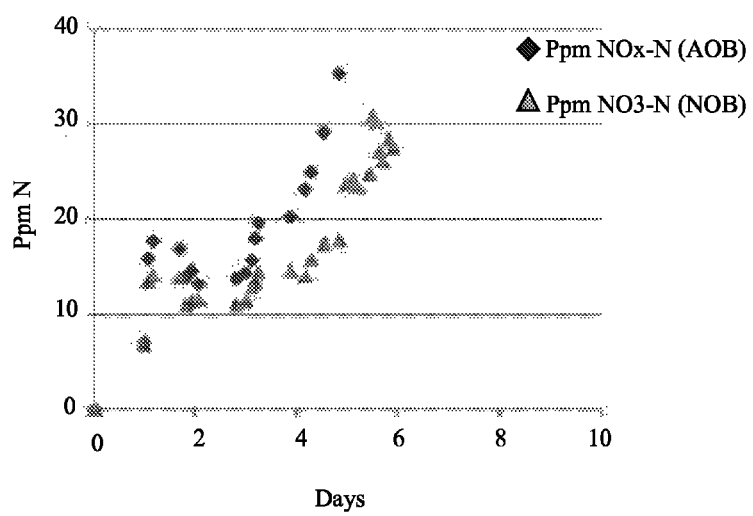
Figure 11A:
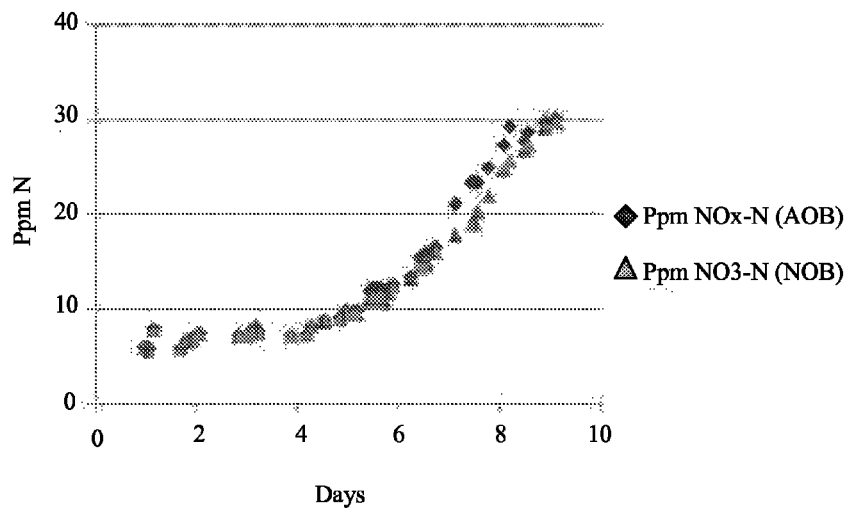
FIGS. 11A-D. Plots of $NO_x$ ($NO_2^-$—N+$NO_3^-$N; blue) and $NO_3^-$N (green), which correspond to the growth of ammonium oxidizing bacteria (AOB) and nitrite oxidizing bacteria (NOB), respectively, for MLE#1 activated sludge and a range of dissolved $CO_2$ concentrations (15 mg/L) and pH (6.5, 7.0, 7.5, and 8.0).
Figure 11B:
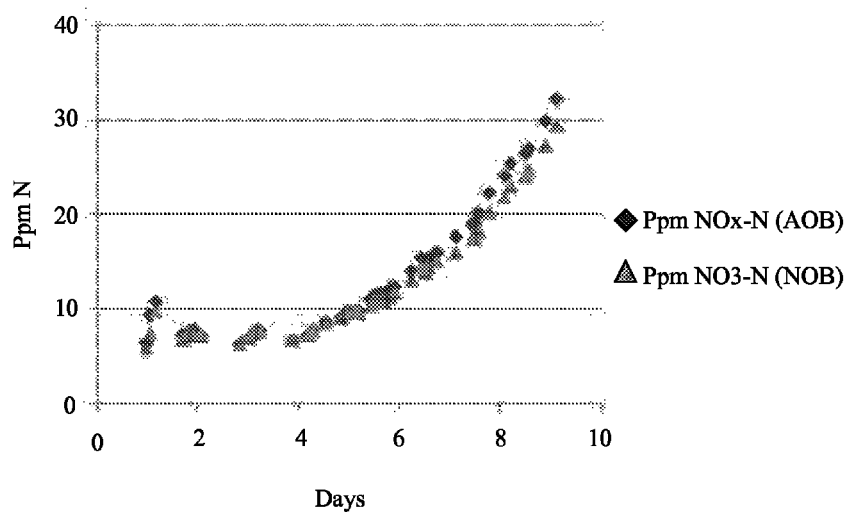
Figure 11C:
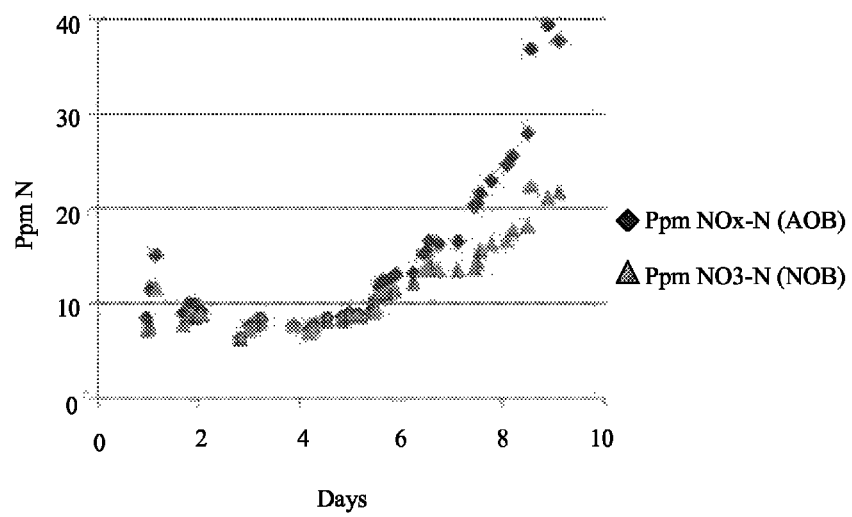
Figure 11D:
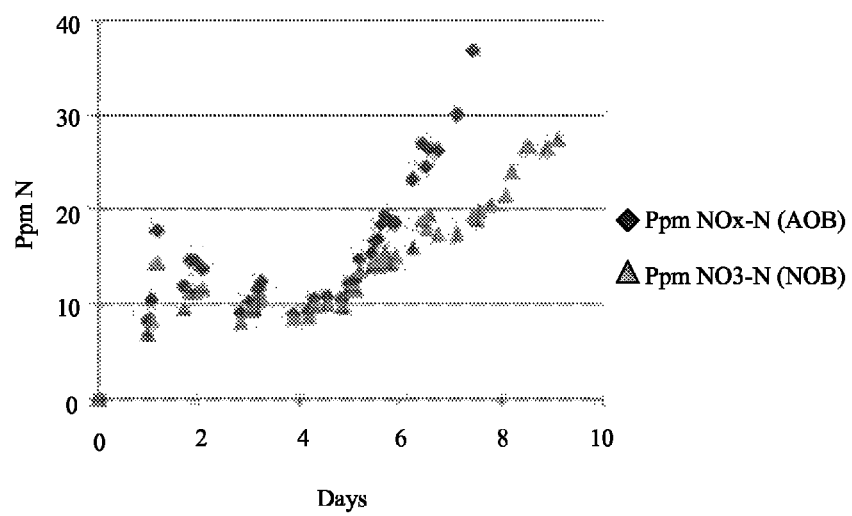

In another embodiment, $CO_2$ stripping can occur between aeration basins for cBOD removal and nitrification. In this configuration, the $CO_2$ Stripping Technology is placed after cBOD removal and before the beginning of the Nitrification step (FIG. 8). This configuration improves soluble $CO_2$ concentrations for nitrification. In addition, the high dissolved oxygen concentration produced by the $CO_2$ stripping technology is advantageous for the nitrification step. This is a marked improvement compared to treating the internal recycle flow as shown in FIGS. 5 and 6. In this configuration, solids removal of the wastewater is assumed to be not necessary for $CO_2$ stripping. Enhanced aeration would be required in Aeration Basin #2 to provide adequate dissolved oxygen for carbonaceous BOD removal.

Alternative Operational Conditions for SHARON Reactor

The Single reactor High activity Ammonia Removal Over Nitire (SHARON) process is based on the large difference in the specific growth rates of the AOB and NOB at elevated temperature (35° C.) and neutral pH (van Dongen, Jetten et al. 2001). The SHARON reactor is operated as a completely stirred tank reactor (CSTR) with an elevated temperature and low solids retention time. When operated in this manner, the NOB will eventually be washed out. The AOB will convert the ammonium to nitrite, which can be fed to downstream reactor, such as the ANAMMOX reactor. With the ANAMMOX reactor, a blend of equal parts ammonium and nitrite is converted under anoxic conditions to nitrogen gas. In another other operating mode, the SHARON reactor is operated as a sequencing batch reactor, where intermittent cycles of full aeration (nitrification to nitrite) and anoxic conditions with methanol addition (denitrification of nitrite to nitrogen gas) can completely remove the ammonium. Because of the elevated temperature requirement, the SHARON reactor is generally restricted to use with anaerobic digester supernatant which has a very high ammonium concentration and elevated temperature.

As shown in Table 1, an alternative to temperature has been identified as an alternative operating condition for the SHARON reactor. By operating at a dissolved $CO_2$ concentration of 14 mg/L and pH 8.2, the AOB grow faster ($\mu_{max,obs}$=1.18 d$^{-1}$; maximum doubling time of 0.59 days) than the NOB ($\mu_{max,obs}$=0.58 d$^{-1}$; maximum doubling time of 1.19 days). It is unknown whether these conditions may further improve the current operational strategy for the SHARON reactor. In other words, our results were obtained at room temperature (~23° C.) and it is unclear whether the AOB maintains a significant advantage in specific growth rate compared to the NOB at elevated temperature (35° C.). However, the $\mu_{max,obs}$ of 1.18 d$^{-1}$ for the AOB with optimal pH and dissolved $CO_2$ is nearly 350% greater than the $\mu_{max,obs}$ calculated for the AOB in a SHARON reactor (0.26 d$^{-1}$) using their growth parameters for the optimal pH (7.23) and identical temperature (23° C.) (Van Hulle, Volcke et al. 2007). In addition, our low temperature $\mu_{max,obs}$ for the AOB is greater than the optimal $\mu_{max,obs}$ for the AOB in the SHARON reactor (0.64 d$^{-1}$) operated at 35° C. and pH 6.8.

TABLE 1

Dissolved $CO_2$ concentration and pH for maximum $\mu_{max,obs}$ of ammonium oxidizing bacteria for alternative growth conditions for SHARON Reactor.

| | |
|---|---|
| optimal pH | 8.20 |
| optimal CO2 | 14.1 |
| AOB High pH μ max, obs | 1.18 |
| pH term | 0.56 |
| CO2 term | 0.47 |
| AOB Low pH μ max, obs | 0.10 |
| pH term | 0.09 |
| CO2 term | 0.50 |
| NOB High pH μ max, obs | 0.58 |
| pH term | 0.59 |
| CO2 term | 0.25 |
| NOB Low pH μ max, abs | 0.09 |
| pH term | 0.09 |
| CO2 term | 0.47 |

These results suggest that SHARON reactor operation may be possible with municipal wastewater, which is treated at 10-30° C. By optimizing the dissolved $CO_2$ concentration and pH of the municipal wastewater and reducing the solids retention time (SRT), the AOB should dominate in the aeration basin. If half of the municipal wastewater is treated in this manner, then the SHARON reactor treated municipal wastewater (nitrite rich) and untreated municipal wastewater could be blended together and fed to an ANAMMOX reactor downstream. There is interest in extending the SHARON/ANAMMOX reactor system for lower temperature operation, but the slow growth rate of the AOB in the SHARON reactor has been identified as the impediment (Vazquez-Padin, Fernadez et al. 2009).

EXAMPLES

Example 1

Field Evaluation of Nitrification in Three BNR Systems

Five wastewater treatment plants (WWTP) representing the three major biological nutrients removal (BNR) configurations, were evaluated in this study that include an Extended Aeration, two MLE, 4-stage Bardenpho, and 5-stage Bardenpho. Dissolved $CO_2$ and pH were measured in each unit operation where dissolved $CO_2$ would be present. Dissolved $CO_2$ measurements were collected with the OxyGuard $CO_2$ meter. All pH values in the field were measured with an OAKTON pH Tester 10. Field measurements were collected during June and July 2009. All pH values in the laboratory were measured with an OAKTON model 510 pH meter.

An analysis of the three major types of wastewater treatment plant (WWTP) configurations was evaluated based on the dissolved $CO_2$ and pH of the influent, unit processes, and effluent (Table 2) and influent properties and operating conditions (Table 3). Dissolved $CO_2$ concentration and pH were the parameters of primary interest. The dissolved $CO_2$ values are representative of the measurements for the different unit processes. The pH values were determined by obtaining surface samples, which may not be representative for the particular unit process. As an example, the anoxic zone for the MLE #1 facility provided results ranging from 26 to 58 mg/L of dissolved $CO_2$ in its basin, where the probe was inserted 8-10 feet below the surface. Although the pH was reported as 7.35, we expected a pH of 6.7-7. None of the WWTPs receive anaerobic sludge brought in from other sources. Although the influent for the 4-stage Bardenpho process typically has a pH of 7.5, we recorded a pH of 7.9.

TABLE 2

Dissolved $CO_2$ concentration and pH of influent, unit processes, and effluent of five wastewater treatment plants.

| | Extended Aeration | | MLE #1 | | MLE #2 | | 4-Stage Bardenpho | | 5-Stage Bardenpho | |
|---|---|---|---|---|---|---|---|---|---|---|
| | $CO_2$ mg/L | pH | $CO_2$ mg/L | pH | $CO_2$ mg/L | pH | $CO_2$ mg/L | pH | $CO_2$ mg/L | pH |
| Influent | 31 | 6.5 | 17 | 7.4 | 12 | 7.4 | 6 | 7.9 | 20 | 7.1 |
| 1° Clarifier | N/A | N/A | 9 | 7.6 | 29 | 6.9 | N/A | N/A | N/A | N/A |
| Anaerobic | N/A | N/A | N/A | N/A | N/A | N/A | N/A | N/A | 31 | 7.0 |
| Anoxic I | 24 | 6.7 | 26-58 | 7.35$^a$ | 23-24 | 7.2 | 11 | 7.3 | 20 | 7.1 |
| Aeration I | 13.5$^a$ | 6.8 | 34 | 6.9 | 15-24 | 7.3$^a$ | 12 | 7.3 | 16 | 7.1 |
| Anoxic II | N/A | N/A | N/A | N/A | N/A | N/A | N/A | N/A | 22 | 7.0 |
| Aeration II | N/A | N/A | N/A | N/A | N/A | N/A | N/A | N/A | 23 | 7.0 |
| 2° Clarifier | 12 | 6.9 | 23 | 7.1 | 23 | 7.3 | 11 | 7.4 | 19 | 7.2 |

TABLE 2-continued

Dissolved $CO_2$ concentration and pH of influent, unit processes, and effluent of five wastewater treatment plants.

| | Extended Aeration | | MLE #1 | | MLE #2 | | 4-Stage Bardenpho | | 5-Stage Bardenpho | |
|---|---|---|---|---|---|---|---|---|---|---|
| | $CO_2$ mg/L | pH | $CO_2$ mg/L | pH | $CO_2$ mg/L | pH | $CO_2$ mg/L | pH | $CO_2$ mg/L | pH |
| Filtration | N/A | N/A | 16 | 7.3 | N/A | N/A | 6 | 7.5 | 12 | 7.4 |
| Effluent | 9 | 7.0 | 16 | 7.3 | 12 | 7.4 | 6 | 7.7 | 10 | 6.9 |

[a]the average of several measurements
N/A: unit processes are not part of the configuration or were not in use.

Large differences in the influent dissolved $CO_2$ concentrations were observed among the WWTP. The influent of the extended aeration plant had a high dissolved $CO_2$ level but receives its influent through a large collection system where anaerobic conditions are quite probable and lead to these high readings. The 4-stage Bardenpho process, which has a low dissolved $CO_2$ concentration, is located in a residential community with a limited collection system. Little time is afforded for the influent to reach anaerobic conditions.

The MLE #2 exhibited a lower influent dissolved $CO_2$ concentration than observed in the primary clarifier. This WWTP is fed by a large underground piping system which suggests that anaerobic conditions are possible. On the day of the plant visit, a thunderstorm was in-progress and had increased the influent rate by 30 percent during the last hour. A diluted $CO_2$ influent concentration was recorded, while the primary clarifier had probably not seen the full effect of this dilution. In addition, the primary clarifier is covered and sealed tank, which may promote anaerobic activity.

The influence of the WWTP configuration is readily seen in the dissolved $CO_2$ concentration of the aeration basins. The dissolved $CO_2$ concentration in the anoxic basin is influenced by the mixture of the influent, internal recycled wastewater, and RAS combined with generation of dissolved $CO_2$ by denitrification. The 5-stage Bardenpho system has the additional contribution of dissolved $CO_2$ from the anaerobic treatment basin. This treated wastewater enters the aeration basin with an elevated dissolved $CO_2$ concentration that ranges from 11 to 58 mg/L. In the aeration basin, dissolved $CO_2$ is produced through the metabolism of the carbonaceous BOD by the heterotrophic bacteria, but dissolved $CO_2$ is also removed by stripping due to the intensive aeration.

The dissolved $CO_2$ concentration and pH were measured in unit processes beyond the activated sludge system. All WWTP are discharging final effluent with elevated dissolved $CO_2$ concentrations when compared to the dissolved $CO_2$ concentration of water in equilibrium with the atmosphere (0.6 mg/L). The elevated level of dissolved CO2 is not surprising since the terminal unit processes do not provide adequate stripping.

TABLE 3

Influent properties and activated sludge operating conditions for five wastewater treatment plants.

| | units | Extended Aeration | MLE #1 | MLE #2 | 4-Stage Bardenpho | 5-Stage Bardenpho |
|---|---|---|---|---|---|---|
| Domestic WW | | 100% | 95% | 81% | 100% | 95% |
| BOD | mg/L | 300 | 200 | 550 | 207 | 200 |
| $NH_4^+$—N | mg/L | 25 | 28 | 25 | 35 | 31 |
| COD | mg/L | 587 | N/A | 1,250 | N/A | N/A |
| MLSS | mg/L | 3,190 | 2,900 | 4,092 | 2,815 | 3,200 |
| MLVSS | mg/L | 2,490 | 2,320 | 3,384 | 2,252 | 2,240 |
| SRT | days | 17 | 12 | 9 | 25.9 | 15 |
| Aeration DO | mg/L | 1-3 | 2-5 | 1.5-3 | 0.8-1.2 | 0.4 |

N/A: Not available.

MLE #2 has the lowest domestic wastewater percentage of all the plants evaluated. It services major food processing industries as indicated by its high influent BOD and COD, which requires an elevated solids concentration (MLSS) to ensure proper treatment.

The dissolved oxygen (DO) concentrations are markedly different among the WWTPs. The extended aeration and the MLE plants show expected DO levels typically encountered at wastewater facilities. The Bardenpho processes utilize reduced DO levels to achieve their BOD and ammonia conversions as higher DO concentrations interfere with conversion in their anoxic and anaerobic zones.

Example II pH vs. Dissolved $CO_2$

An activated sludge sample was collected from the aeration basin of each WWTP evaluated. Within one hour of collection, the sample was evaluated in the laboratory to determine the pH at varying dissolved $CO_2$ concentrations. The sample was placed in a one liter beaker in a sealed desiccant cabinet and air or an air/$CO_2$ mixture was introduced into the cabinet. An air pump inside the cabinet subsequently introduced the atmosphere into the beaker. The atmosphere was maintained for a minimum of 15 minutes at which time dissolved $CO_2$ and pH were measured.

The experiment was conducted to determine the maximum specific growth rate at combinations of three selected dissolved $CO_2$ concentrations (5, 10 and 15 mg/l) and four pH levels (6.5, 7.0, 7.5 and 8.0). Desiccant cabinets were fabricated that maintained the appropriate $pCO_2$ with four reactors placed inside the cabinets at the appropriate pH. All reactors were operated at room temperature (23° C.). Phosphate buffer was used to control pH with minor additions of base or acid for adjustment at the pH 8 and 6.5 conditions. Nitrite and nitrate concentration measurements were taken at 1.5 hour intervals, 18-20 hours per day for approximately 10 days. The plots of the nitrate ($NO_3^-$—N) and $NO_x$ ($NO_2^-$—N+$NO_3^-$—N) for each experimental reactor are provided in FIGS. 9A-11D.

Figure 12:
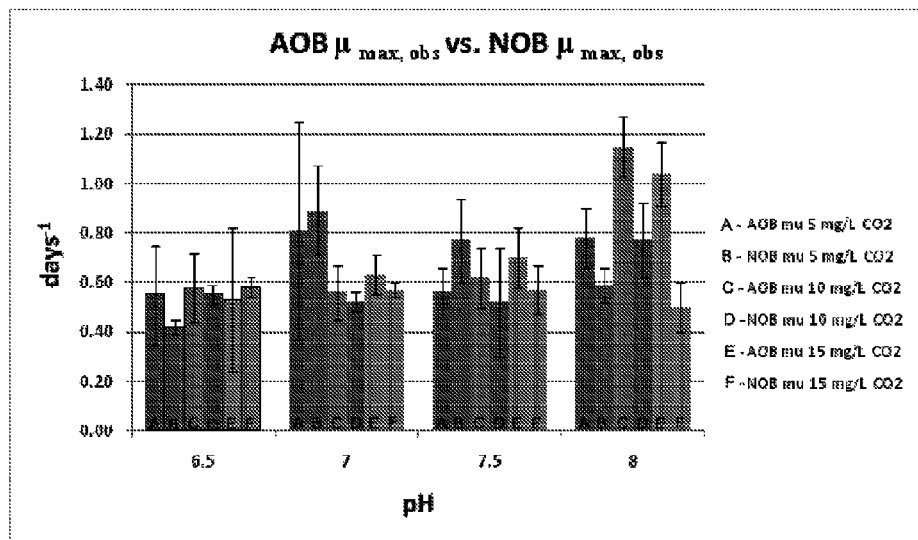
FIG. 12. Ammonium oxidizing bacteria (AOB) and Nitrite oxidizing bacteria (NOB) $\mu_{max,obs}$ of MLE#1 activated sludge for range of dissolved $CO_2$ concentrations (5, 10, and 15 mg/L) and pH (6.5, 7.0, 7.5, and 8.0). The bars represent the 95% confidence interval.
Figure 13:
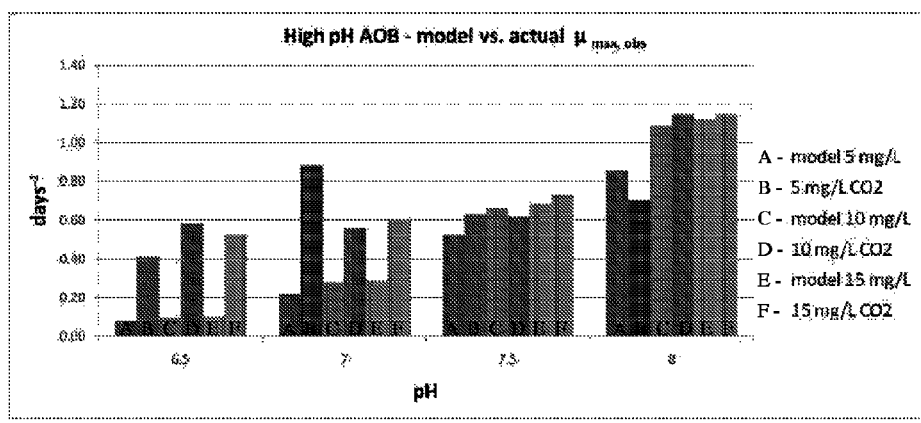
FIG. 13. High pH ammonium oxidizing bacteria (AOB) $\mu_{max,obs}$ of MLE#1 activated sludge for range of dissolved $CO_2$ concentrations (5, 10, and 15 mg/L) and pH (6.5, 7.0, 7.5, and 8.0). The red columns are actual values with large 95% confidence interval.
Figure 14:
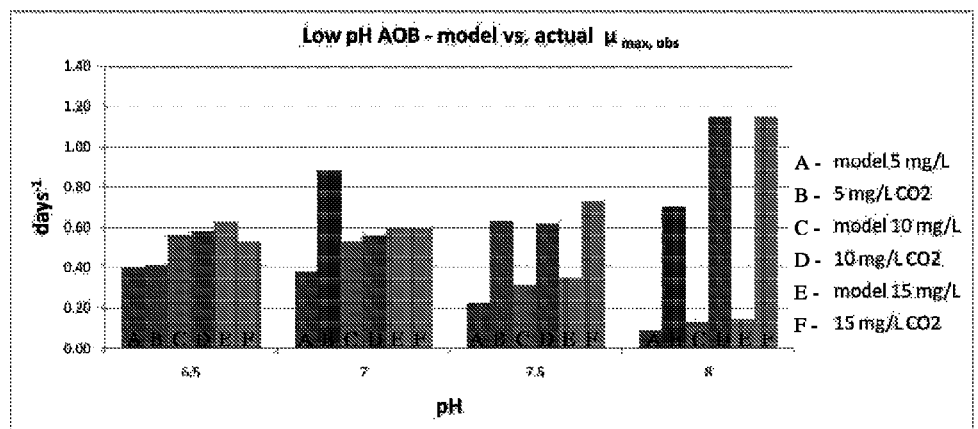
FIG. 14. Low pH ammonium oxidizing bacteria (AOB) $\mu_{max,obs}$ of MLE#1 activated sludge for range of dissolved $CO_2$ concentrations (5, 10, and 15 mg/L) and pH (6.5, 7.0, 7.5, and 8.0). The red columns are actual values with large 95% confidence interval.
Figure 15:
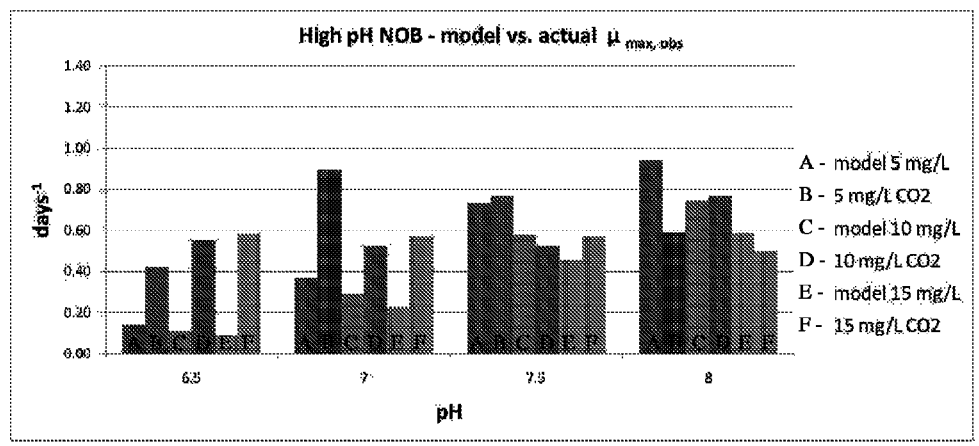
FIG. 15. High pH nitrite oxidizing bacteria (NOB) $\mu_{max,obs}$ of MLE#1 activated sludge for range of dissolved $CO_2$ concentrations (5, 10, and 15 mg/L) and pH (6.5, 7.0, 7.5, and 8.0). The red columns are actual values with large 95% confidence interval.
Figure 16:
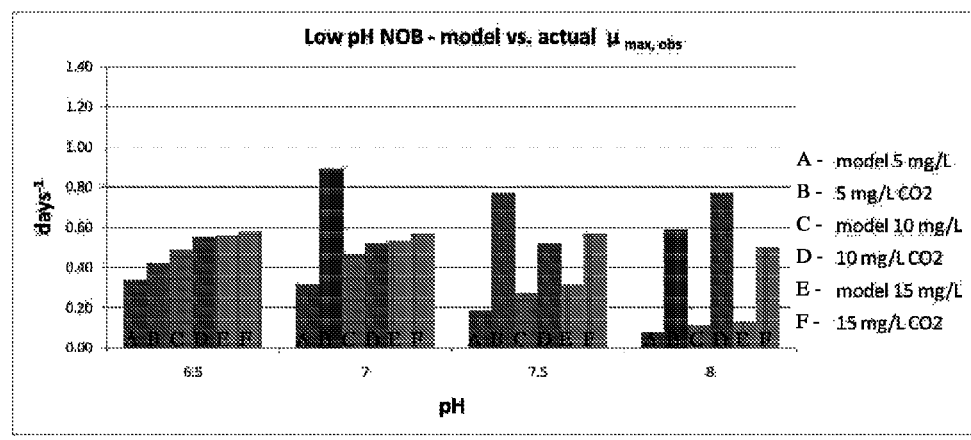
FIG. 16. Low pH nitrite oxidizing bacteria (NOB) $\mu_{max,obs}$ of MLE#1 activated sludge for range of dissolved $CO_2$ concentrations (5, 10, and 15 mg/L) and pH (6.5, 7.0, 7.5, and 8.0). The red columns are actual values with large 95% confidence interval.

From these plots, it is clear that there are some gross differences in the rate of growth of the AOB and NOB populations, especially at higher pH. Other plots suggest lower rate of growth for low dissolved $CO_2$ concentration and pH. These data were analyzed by the use of a non-linear regression software application, which estimated the maximum, observed specific growth rate ($\mu_{max,obs}$) for the AOB and NOB populations (FIG. 12).

These results suggest a significant improvement in AOB $\mu_{max,obs}$ is possible by providing pH 8 and dissolved $CO_2$ between 10-15 mg/L. A large difference in the $\mu_{max,obs}$ was observed between the AOB and NOB for these conditions. The increase in the $\mu_{max,obs}$ at lower pH and dissolved $CO_2$ concentrations suggested the presence of two AOB and NOB populations. The AOB and NOB population were split into Low and High pH subpopulations and the growth parameters were determined (Table 4 and FIGS. 13-16).

TABLE 4

Estimated growth parameters ($\mu_{max}$, $CO_2$ and pH) for two ammonium oxidizing bacteria (AOB) and nitrite oxidizing bacteria (NOB) populations in MLE#1 activated sludge.

| AOB High pH | | | NOB High pH | | |
|---|---|---|---|---|---|
| $\mu_{max}$ | 4.5 | | $\mu_{max}$ | 4.0 | |
| pH Term | | pH | pH Term | | pH |
| K1 | 1.58E−08 | 7.8 | K1 | 3.16E−08 | 7.5 |
| K2 | 2.51E−09 | 8.6 | K2 | 3.16E−09 | 8.5 |

TABLE 4-continued

Estimated growth parameters ($\mu_{max}$, $CO_2$ and pH) for two ammonium oxidizing bacteria (AOB) and nitrite oxidizing bacteria (NOB) populations in MLE#1 activated sludge.

| $CO_2$ term | | | $CO_2$ term | | |
|---|---|---|---|---|---|
| KCO2 | 8 | | KCO2 | 3 | |
| K1 | 25 | | K1 | 5 | |

| AOB Low pH | | | NOB Low pH | | |
|---|---|---|---|---|---|
| $\mu_{max}$ | 2.1 | | $\mu_{max}$ | 2.0 | |
| pH Term | | pH | pH Term | | pH |
| K1 | 6.31E−07 | 6.2 | K1 | 6.31E−07 | 6.2 |
| K2 | 6.31E−08 | 7.2 | K2 | 6.31E−08 | 7.2 |
| $CO_2$ term | | | $CO_2$ term | | |
| KCO2 | 10 | | KCO2 | 12 | |
| K1 | 50 | | K1 | 50 | |

The growth parameters for both AOB and NOB populations were used to estimate the improvement in the $\mu_{max,obs}$ for the complete nitrification of ammonium for different wastewater treatment plants that optimize dissolved $CO_2$ concentration (5.5 mg/L) without optimization of the pH (Table 5). The corresponding pH was extrapolated for the optimized dissolved $CO_2$ concentration by using the data used for generating FIGS. 9A-D. For this analysis, the $\mu_{max,obs}$ of the nitrifier (AOB or NOB) that limits the overall nitrification reaction for the existing and optimized condition were compared directly. This analysis suggests that four of the seven systems may have greater rates of complete nitrification by optimizing the dissolved $CO_2$ concentration. The greatest improvement was predicted for the 4-stage BardenPho system. When the dissolved $CO_2$ concentration (5.5 mg/L) and pH (8.07) were optimized, the improvement in the $\mu_{max,obs}$ were predicted for all seven systems with a range of 59-122% (Table 6).

TABLE 5

Estimated improvement of $\mu_{max,obs}$ of nitrifying bacteria of six wastewater treatment plants with six unique BNR configurations for complete nitrification through optimal dissolved $CO_2$ concentration and corresponding pH.

| | | Modified Ludzack-Ettinger | | BardenPho | | High Purity $O_2$ | |
|---|---|---|---|---|---|---|---|
| | Extended Aeration | #1 | #2 | 4-stage | 5-stage | cBOD Removal | Nitrification |
| Actual pH | 6.8 | 6.9 | 7.3 | 7.3 | 7.1 | 6.8 | 6.8 |
| Actual CO2 | 13.5 | 34 | 20 | 12 | 16 | 64 | 40 |
| µ max, obs actual | 0.63 | 0.63 | 0.49 | 0.50 | 0.56 | 0.52 | 0.62 |
| µ max, obs LIMITING | 0.56 | 0.58 | 0.43 | 0.41 | 0.50 | 0.49 | 0.58 |
| AOB High pH | 0.19 | 0.19 | 0.49 | 0.50 | 0.35 | 0.11 | 0.15 |
| pH term | 0.09 | 0.11 | 0.24 | 0.24 | 0.17 | 0.09 | 0.09 |
| CO2 term | 0.47 | 0.39 | 0.45 | 0.47 | 0.47 | 0.27 | 0.36 |
| AOB Low pH | 0.63 | 0.63 | 0.47 | 0.43 | 0.56 | 0.52 | 0.62 |
| pH term | 0.61 | 0.59 | 0.43 | 0.43 | 0.52 | 0.61 | 0.61 |
| CO2 term | 0.50 | 0.51 | 0.53 | 0.48 | 0.51 | 0.41 | 0.49 |
| NOB High pH | 0.17 | 0.10 | 0.29 | 0.41 | 0.26 | 0.05 | 0.07 |
| pH term | 0.17 | 0.20 | 0.38 | 0.38 | 0.28 | 0.17 | 0.17 |
| CO2 term | 0.25 | 0.13 | 0.19 | 0.27 | 0.23 | 0.07 | 0.11 |
| NOB Low pH | 0.56 | 0.58 | 0.43 | 0.38 | 0.50 | 0.49 | 0.58 |
| pH term | 0.61 | 0.59 | 0.43 | 0.43 | 0.52 | 0.61 | 0.61 |
| CO2 term | 0.46 | 0.49 | 0.50 | 0.45 | 0.48 | 0.41 | 0.48 |
| corresponding pH | 7.52 | 7.54 | 7.49 | 7.87 | 7.68 | 7.62 | 7.62 |
| optimal CO2 | 5.5 | 5.5 | 5.5 | 5.5 | 5.5 | 5.5 | 5.5 |
| µ max, obs optimal | 0.73 | 0.75 | 0.71 | 0.91 | 0.83 | 0.80 | 0.80 |
| µ max, obs LIMITING | 0.56 | 0.58 | 0.54 | 0.83 | 0.69 | 0.64 | 0.64 |
| AOB High pH | 0.56 | 0.58 | 0.54 | 0.83 | 0.69 | 0.64 | 0.64 |
| pH term | 0.33 | 0.34 | 0.32 | 0.49 | 0.41 | 0.38 | 0.38 |
| CO2 term | 0.37 | 0.37 | 0.37 | 0.37 | 0.37 | 0.37 | 0.37 |

TABLE 5-continued

Estimated improvement of $\mu_{max,obs}$ of nitrifying bacteria of six wastewater treatment plants with six unique BNR configurations for complete nitrification through optimal dissolved $CO_2$ concentration and corresponding pH.

|  | Extended Aeration | Modified Ludzack-Ettinger #1 | Modified Ludzack-Ettinger #2 | BardenPho 4-stage | BardenPho 5-stage | High Purity $O_2$ cBOD Removal | High Purity $O_2$ Nitrification |
|---|---|---|---|---|---|---|---|
| AOB Low pH | 0.23 | 0.22 | 0.24 | 0.13 | 0.18 | 0.20 | 0.20 |
| pH term | 0.32 | 0.31 | 0.33 | 0.18 | 0.25 | 0.27 | 0.27 |
| CO2 term | 0.34 | 0.34 | 0.34 | 0.34 | 0.34 | 0.34 | 0.34 |
| NOB High pH | 0.73 | 0.75 | 0.71 | 0.91 | 0.83 | 0.80 | 0.80 |
| pH term | 0.49 | 0.49 | 0.47 | 0.60 | 0.55 | 0.53 | 0.53 |
| CO2 term | 0.38 | 0.38 | 0.38 | 0.38 | 0.38 | 0.38 | 0.38 |
| NOB Low pH | 0.19 | 0.19 | 0.20 | 0.11 | 0.15 | 0.17 | 0.17 |
| pH term | 0.32 | 0.31 | 0.33 | 0.18 | 0.25 | 0.27 | 0.27 |
| CO2 term | 0.30 | 0.30 | 0.30 | 0.30 | 0.30 | 0.30 | 0.30 |
| % improvement MAX | 16% | 20% | 47% | 83% | 48% | 53% | 29% |
| % improvement LIMITING | 0% | 0% | 26% | 100% | 37% | 31% | 11% |

TABLE 6

Estimated improvement of $\mu_{max,obs}$ of nitrifying bacteria of six wastewater treatment plants with six unique BNR configurations for complete nitrification through optimal dissolved $CO_2$ concentration and pH.

|  | Extended Aeration | Modified Ludzack-Ettinger #1 | Modified Ludzack-Ettinger #2 | BardenPho 4-stage | BardenPho 5-stage | High Purity $O_2$ cBOD Removal | High Purity $O_2$ Nitrification |
|---|---|---|---|---|---|---|---|
| pH | 6.8 | 6.9 | 7.3 | 7.3 | 7.1 | 6.8 | 6.8 |
| CO2 | 13.5 | 34 | 20 | 12 | 16 | 64 | 40 |
| μ max, obs actual | 0.63 | 0.63 | 0.49 | 0.50 | 0.56 | 0.52 | 0.62 |
| μ max, obs Limiting | 0.56 | 0.58 | 0.43 | 0.41 | 0.50 | 0.49 | 0.58 |
| AOB High pH | 0.19 | 0.19 | 0.49 | 0.50 | 0.35 | 0.11 | 0.15 |
| pH term | 0.09 | 0.11 | 0.24 | 0.24 | 0.17 | 0.09 | 0.09 |
| CO2 term | 0.47 | 0.39 | 0.45 | 0.47 | 0.47 | 0.27 | 0.36 |
| AOB Low pH | 0.63 | 0.63 | 0.47 | 0.43 | 0.56 | 0.52 | 0.62 |
| pH term | 0.61 | 0.59 | 0.43 | 0.43 | 0.52 | 0.61 | 0.61 |
| CO2 term | 0.50 | 0.51 | 0.53 | 0.48 | 0.51 | 0.41 | 0.49 |
| NOB High pH | 0.17 | 0.10 | 0.29 | 0.41 | 0.26 | 0.05 | 0.07 |
| pH term | 0.17 | 0.20 | 0.38 | 0.38 | 0.28 | 0.17 | 0.17 |
| CO2 term | 0.25 | 0.13 | 0.19 | 0.27 | 0.23 | 0.07 | 0.11 |
| NOB Low pH | 0.56 | 0.58 | 0.43 | 0.38 | 0.50 | 0.49 | 0.58 |
| pH term | 0.61 | 0.59 | 0.43 | 0.43 | 0.52 | 0.61 | 0.61 |
| CO2 term | 0.46 | 0.49 | 0.50 | 0.45 | 0.48 | 0.41 | 0.48 |
| optimal pH | 8.07 | 8.07 | 8.07 | 8.07 | 8.07 | 8.07 | 8.07 |
| optimal CO2 | 5.5 | 5.5 | 5.5 | 5.5 | 5.5 | 5.5 | 5.5 |
| μ max, obs Max | 0.92 | 0.92 | 0.92 | 0.92 | 0.92 | 0.92 | 0.92 |
| μ max, obs Limiting | 0.92 | 0.92 | 0.92 | 0.92 | 0.92 | 0.92 | 0.92 |
| AOB High pH | 0.92 | 0.92 | 0.92 | 0.92 | 0.92 | 0.92 | 0.92 |
| pH term | 0.55 | 0.55 | 0.55 | 0.55 | 0.55 | 0.55 | 0.55 |
| CO2 term | 0.37 | 0.37 | 0.37 | 0.37 | 0.37 | 0.37 | 0.37 |
| AOB Low pH | 0.09 | 0.09 | 0.09 | 0.09 | 0.09 | 0.09 | 0.09 |
| pH term | 0.12 | 0.12 | 0.12 | 0.12 | 0.12 | 0.12 | 0.12 |
| CO2 term | 0.34 | 0.34 | 0.34 | 0.34 | 0.34 | 0.34 | 0.34 |
| NOB High pH | 0.92 | 0.92 | 0.92 | 0.92 | 0.92 | 0.92 | 0.92 |
| pH term | 0.61 | 0.61 | 0.61 | 0.61 | 0.61 | 0.61 | 0.61 |
| CO2 term | 0.38 | 0.38 | 0.38 | 0.38 | 0.38 | 0.38 | 0.38 |
| NOB Low pH | 0.07 | 0.07 | 0.07 | 0.07 | 0.07 | 0.07 | 0.07 |
| pH term | 0.12 | 0.12 | 0.12 | 0.12 | 0.12 | 0.12 | 0.12 |
| CO2 term | 0.30 | 0.30 | 0.30 | 0.30 | 0.30 | 0.30 | 0.30 |
| % improvement Max | 46% | 47% | 90% | 85% | 64% | 76% | 48% |
| % improvement LIMITING | 63% | 59% | 115% | 122% | 83% | 87% | 59% |

Example III

Specific Growth Rate Measurement in Lab-Scale Bioreactors

The experiments were conducted based upon previously published guidelines (Melcer et al. 2003). Two 3 liter beakers were used for the reactors. The control reactor utilized air, while the experimental reactor was aerated with a mixture of air and pure $CO_2$ to produce dissolved $CO_2$ concentrations of 12 and 103 mg/L. The pH was maintained between 7.0±0.05 through the addition of a phosphate buffer. Each reactor received identical phosphate buffer additions.

Both reactors were fed influent from the MLE #1 WWTP. A series of preliminary experiments were conducted to establish appropriate operating conditions. Based on these results, 60 mg/L of $NH_4^+$—N was added to the influent wastewater which contained, on average, 25 mg/L of $NH_4^+$—N. The dissolved oxygen was held constant at 8.3 mg/L as $O_2$, which ensured that oxygen was not limiting. Each reactor had an initial addition of 0.5 grams of sodium bicarbonate with 0.5 gram additions during the reaction sequence based on $NH_4^+$—N conversion.

Each reactor was inoculated with activated sludge that was collected from the aeration basin of the MLE #1's activated sludge system on the same day that the experiment was initiated. A MLVSS target value of 35 mg/L was specified in these experiments. Throughout the experiment, $NH_4^+$, $NO_2^-$, $NO_3^-$, pH, and dissolved oxygen (DO) were routinely measured. A non-linear regression model was used to regresses the $NO_x^-$ concentration levels ($NO_2^-$+$NO_3^-$) versus time and estimate specific growth rate, µ, of the nitrifying bacteria by using a software package (Oakdale Engineering).

Figure 17:
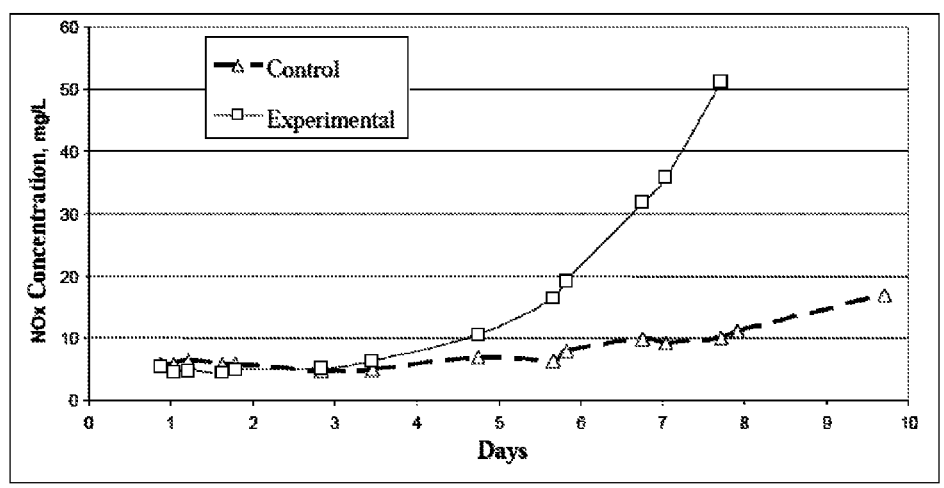
FIG. 17: Evaluation of specific growth rate of nitrifying bacteria via accumulated $NO_x$ concentration for wastewater and activated sludge from the WWTP utilizing extended aeration. The pH was held constant at 7 and reactors were aerated with air (control) or a mixture of air and pure $CO_2$ to operate at dissolved $CO_2$ of 7 mg/L (experimental).

An initial study of the effect of dissolved $CO_2$ concentration on the specific growth rate of nitrifying bacteria was conducted using activated sludge from the extended aeration facility. The results of an analysis with pH 7.0 and $CO_2$ concentration at 7 mg/L versus air are provided (FIG. 17). The selection of the 7 mg/L dissolved $CO_2$ (0.4%) concentration was based on previous research (Denecke and Liebig 2003).

Both reactors display a buildup of $NO_x^-$ concentration ($NO_2^-$ and $NO_3^-$) over a 10 day period. However, it is evident that the rate of $NO_x^-$ concentration buildup is significantly higher in the experimental reactor. The specific growth rate of the nitrifying bacteria was estimated by fitting the non-linear response. The specific growth rate, µ for both conditions and the associated 95% confidence interval are provided in Table 7. The regression analysis was conducted to $NO_x$ values of approximately 20 mg/L. Inhibition effects were observed at values greater than this concentration (data not shown).

TABLE 7

Estimated specific growth rate of nitrifying bacteria and 95% confidence interval of the activated sludge from the WWTP with extended aeration for two defined dissolved $CO_2$ concentrations.

| Reactor | Dissolved $CO_2$ (mg/L) | µ (days$^{-1}$) | Lower Limit | Upper Limit |
|---|---|---|---|---|
| Control | 0.6 | 0.578 | 0.479 | 0.677 |
| Experimental | 7 | 1.011 | 0.802 | 1.219 |

Further research was conducted using activated sludge from the WWTP with MLE #1. The sludge was evaluated at varying levels of $pCO_2$ from 7 to 17 mg/L at a constant pH of 7. An optimum specific growth rate of 0.84 days$^{-1}$ was achieved at a dissolved $CO_2$ of 12 mg/L.

Example IV

Estimation of Specific Growth Rate of Nitrifying Bacteria

Growth rate optimization was based on Monod kinetics. The Haldane equation was used to determine the effect of the dissolved $CO_2$ concentration on the specific growth rate. The pH sensitivity of the specific growth rate was calculated by using an optimal pH of 8 as reported optimum values range from 7.5 to 8.5 (Metcalf & Eddy 2003). Specific growth rate optimization was based on results previously reported (Denecke and Liebig 2003). The parameters and coefficients are provided in Table 8.

TABLE 8

Constants used to calculate the optimal specific growth rate for nitrifying bacteria.

| Constant | Value |
|---|---|
| $K_{CO2}$, mg/L | 0.5 |
| Ki, mg/L | 42 |
| $K_1$ for pH | 1.58E−07 |
| $K_2$ for pH | 6.31E−10 |
| $\mu_{max}$ | 0.75 |
| b | 0.1 |
| pH Term Max | 0.88 |
| $CO_2$ Term Max | 0.82 |

As disclosed herein, the relationship between the maximum specific growth rate of the nitrifying bacteria and corresponding dissolved $CO_2$ can be described by the Andrew's equation. The Andrew's equation is similar to the traditional Monod equation, which describes the specific growth rate as a function of the true maximum specific growth rate and a single rate limiting substrate. However, the Andrew's equation shown below includes an additional inhibition term that reduces the specific growth rate for high concentrations of the substrate.

$$\mu = \mu_{max} \frac{[CO_2]}{\left([CO_2] + K_{CO2} + \frac{[CO_2]^2}{K_T}\right)}$$

In addition to the $CO_2$ term described, the specific growth rate is also adjusted for the pH by the following term, where K1 and K2 are constants specific for a bacterial species.

$$\text{pH correction term} = \left(\frac{1}{1 + [H^+]/K1 + K2/[H^+]}\right)$$

An overall expression for $\mu_{max,obs}$ includes $\mu_{max}$ and terms that correct for dissolved $CO_2$, pH, ammonium, dissolved oxygen (DO), and temperature The pH and dissolved $CO_2$ terms are normalized to generate values between 0-1 by dividing the equations above by the maximum term value. In this way, all correction terms have values between 0-1 and can be multiplied together to adjust $\mu_{max,obs}$.

$$\mu_{max,obs} = \mu_{max}(CO_2 \text{ term})(\text{pH term})(N \text{ term})(DO \text{ term})(\text{Temp term})$$

A simpler expression is provided, which condenses $\mu_{max}$ and terms that correct for dissolved $CO_2$ and pH.

$$\mu_{max,obs} = (\mu_{max,CO2,pH})(\text{N term})(\text{DO term})(\text{Temp term})$$

The formula to determine the field and optimum specific growth rate of the nitrifying bacteria is provided:

$$\mu obs = \mu max \times \frac{\frac{[CO2]}{[CO2] + Ks + \frac{[CO2]^2}{Ki}}}{CO2 \text{ Term Max}} \times \frac{1}{\left(1 + \frac{[H+]}{K1} + \frac{K2}{[H+]}\right)} - b$$

The $CO_2$ term max is the value obtained at a dissolved $CO_2$ value of 5 mg/L. The pH term max is the value obtained at a pH of 8. These values are used to normalize the formula by using the maximum specific growth rate for ideal dissolved $CO_2$ concentration and pH. Denecke reported that a 5 mg/L dissolved $CO_2$ concentration is equivalent to 0.4% $CO_2$. When calculated using Henry's constant, 0.4% equates to 6.89 mg/L. For purposes of this study, 5 mg/L was used as the optimum $CO_2$ concentration. Field pH measurements used in this study were calculated from activated sludge evaluated at varying levels of $CO_2$ concentrations in the laboratory. Although actual field measurements are reported later in this paper, there was concern as to how well they represented actual pH values at the specified dissolved $CO_2$ concentrations.

A sample of activated sludge from the aeration basin of each process was obtained and evaluated at different dissolved $CO_2$ concentrations (FIG. 1). The numbers in the figure represent the dissolved $CO_2$ concentrations in the aeration basin for the WWTP.

Results show a general downward trend (lower pH) with increasing levels of $CO_2$. Although different configuration types appear to segregate, this difference maybe more related to their MLVSS concentrations. When the dissolved $CO_2$ concentration is reduced for activated sludge with elevated levels, the pH also increases. For example, the reduction of the dissolved $CO_2$ concentration to 15 mg/L would produce pH of 7.1-7.5.

Each WWTP was further evaluated to determine the potential for increasing the specific growth rate of the nitrifying bacteria by optimizing the dissolved $CO_2$ concentration and allowing for pH adjustment (FIG. 1). Our results, shown in Table 9, suggest that improvements are possible for each WWTP evaluated in this study with the MLE facilities offering the greatest potential. The Bardenpho processes offer less potential for improvement due to the low dissolved $CO_2$ concentrations and higher operating pH values, which are near the optimum values.

TABLE 9

Optimum specific growth rate of nitrifying bacteria for optimal dissolved $CO_2$ concentration of 5 mg/L and corresponding pH.

| Properties | Extended Aeration | MLE #1 | MLE #2 | 4-Stage Bardenpho | 5-Stage Bardenpho |
|---|---|---|---|---|---|
| $CO_2$, field | 14 | 34 | 20 | 12 | 16 |
| pH, field | 7.17 | 6.92 | 7.01 | 7.57 | 7.26 |
| pH, corresponding to optimal $CO_2$ | 7.54 | 7.56 | 7.51 | 7.89 | 7.7 |
| μ, observed | 0.4238 | 0.22 | 0.3226 | 0.5501 | 0.4368 |
| μ, optimum | 0.6016 | 0.6058 | 0.595 | 0.6473 | 0.6297 |
| μ Improvement | 42% | 175% | 84% | 18% | 44% |

Example V

Evaluation of Nitrifying Bacteria Abundance by Fluorescence In Situ Hybridization Four fluorescently-labeled oligonucleotide hybridization probes, that target two ammonia oxidizing bacteria (AOB) and nitrifying oxidizing bacteria (NOB) groups were used in this study (Table 10) were synthesized and conjugated with the cyanine dye, Cy3, before purification with oligonucleotide probe purification cartridges. Fluorescently labeled probes were diluted to 50 ng/μL with RNase-free water and stored at −20° C. in the dark. Samples (1 mL) were collected from the aeration basin from each WWTP and fixed with 1 mL of 4% PFA for 12-24 hours. The samples were centrifuged and supernatant decanted, and resuspended in 2 mL of ethanol PBS (EtOH-PBS). The samples were stored at −20° C. until further analysis. Fixed samples were applied to a sample well on a 10 well Heavy Teflon Coated microscope slide (Cel-Line Associates, New Field, N.J.) and air-dried. After dehydration with an increasing ethanol series (50, 80, 95% [vol/vol]ethanol, 1 min each), each sample well was covered with a mixture of 18 μL of hybridization buffer (20% [vol/vol] formamide, 0.9 M NaCl, 100 mM Tris HCl [pH 7.0], 0.1% SDS) (DelosReyes et al. 1997) and 2 μL of the stock fluorescently labeled oligonucleotide probe. The hybridizations were conducted in a moisture chamber containing excess hybridization buffer (to prevent dehydration of buffer on sample wells) for 1.5 h, in the dark, at 46° C. The slides were washed for 30 min at 48° C. with 50 mL of pre-warmed washing buffer solution (215 mM NaCl, 20 mM Tris HCl [pH 7.0], 0.1% SDS, and 5 mM EDTA) (DelosReyes et al. 1997). Fixed, hybridized cells were mounted with Type FF immersion oil (Cargille, Cedar Grove, N.J.) and a cover slip. Cells were stained with 4',6-diamidino-2-phenylindole (DAPI) at a concentration of 1 μg/mL for 1 minute and rinsed with DI water.

TABLE 10

FISH probe information.

| | Probe | Targeted bacteria | Reference |
|---|---|---|---|
| AOB | NSM156 | *Nitrosomonas* spp., *Nitrosococcus mobilis* | (Mobarry et al. 1996) |
| | Nsv433 | *Nitrosospira* spp. | (Mobarry et al. 1996) |
| NOB | NIT3 | *Nitrobacter* spp. | (Wagner et al. 1996) |
| | Ntspa0712 | most members of the phylum *Nitrospirae* | (Daims et al. 2001) |

Whole cell fluorescence was visualized with an upright epiflourescence microscope (Leitz DiaPlan, Heerbrugg, Switzerland), and digital images were captured using a Spot-FLEX charge coupled device (CCD) camera (Diagnostic Instruments, Inc., Sterling Heights, Mich.). Images were collected using a 100× oil objective and constant exposure time of 1.2 sec and gain of 2. For each FISH probe, ten images were collected for each sample and analyzed based on the relative abundance of cy3 fluorescent cells. Direct measurement of abundance was difficult due to the background fluorescence of the samples, thus a simple scale (FIG. 18) was used to estimate the abundance. The value of each set of images was totaled and averaged.

Figure 18:
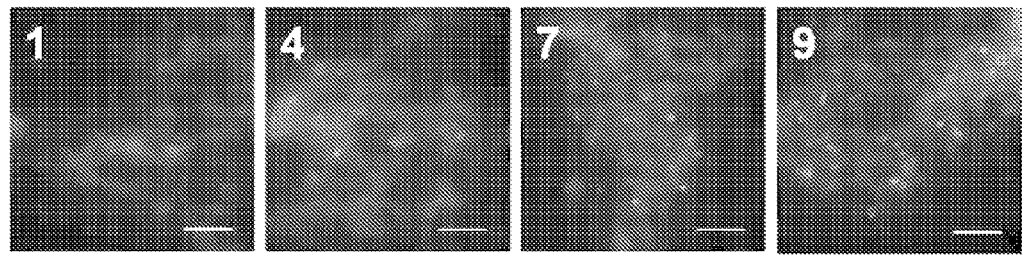
FIG. 18: FISH Analysis Scale Representation. Scale bars equal 10 µm.
Figure 19:
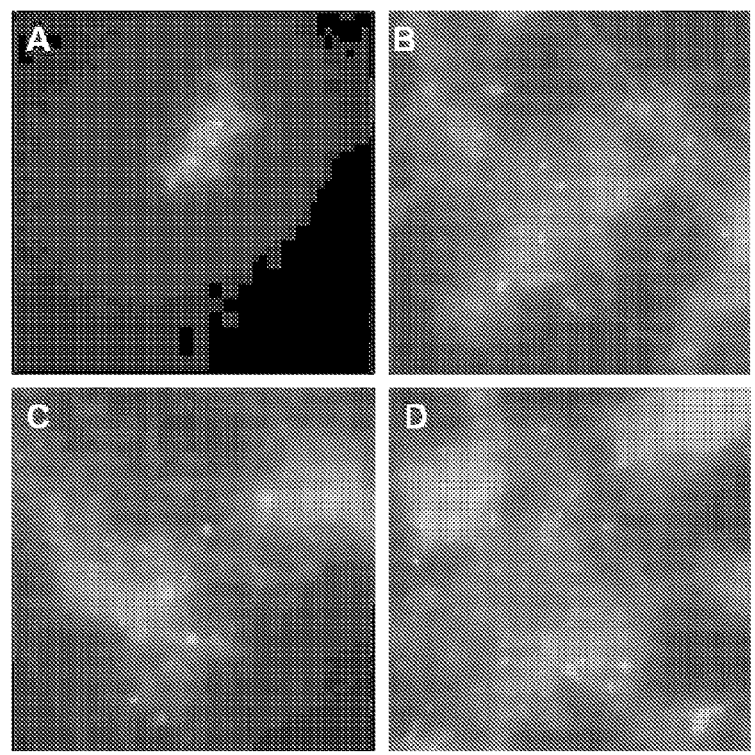
FIG. 19: Representative FISH images for nitrifying bacteria in MLE #1 including *Nitrosomonas* spp., *Nitrosococcus mobilis* (A); *Nitrosospira* spp. (B); *Nitrobacter* spp. (C); and most members of the phylum *Nitrospirae* (D).
Figure 20:
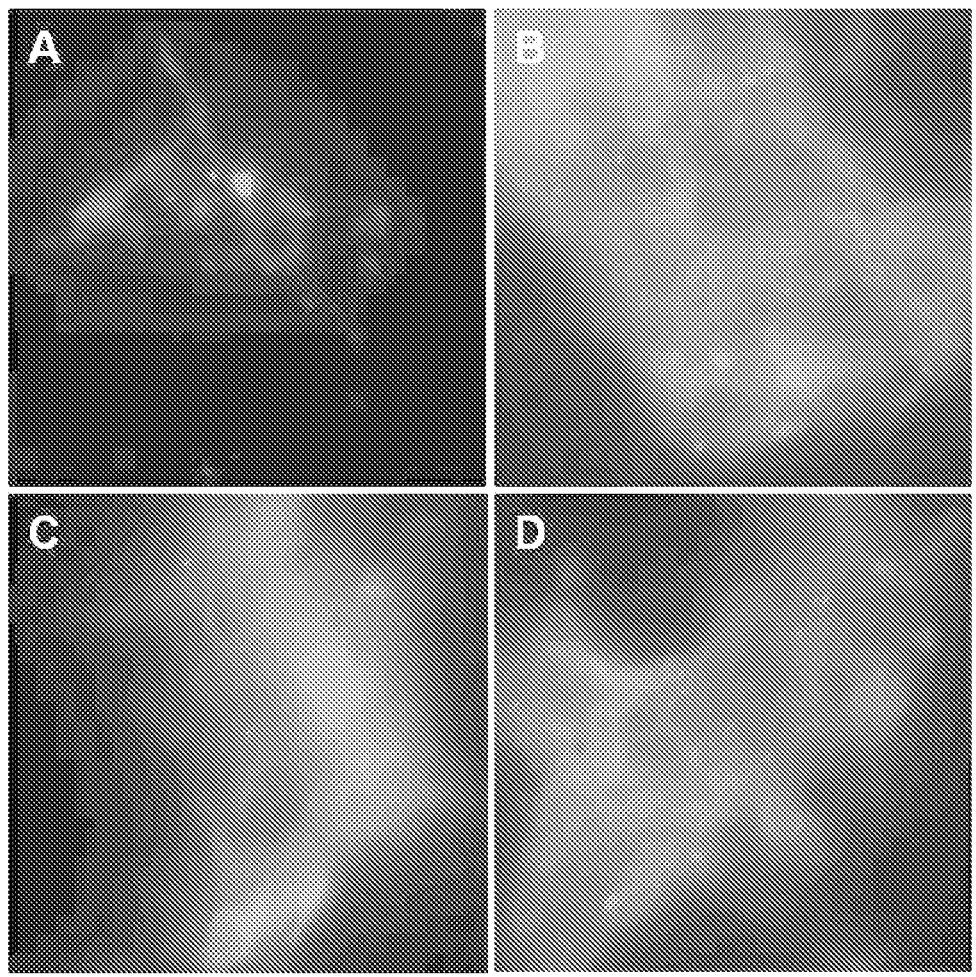
FIG. 20: Representative FISH images for 4-Stage Bardenpho including *Nitrosomonas* spp., *Nitrosococcus mobilis* (A); *Nitrosospira* spp. (B); *Nitrobacter* spp. (C); and most members of the phylum *Nitrospirae* (D).

Representative FISH images for the samples collected from the MLE #1 and the 4-stage Bardenpho are provided in FIGS. 19 and 20. Individual cells and small clusters of cells are present in the flocs for each of the major ammonia oxidizing bacteria (AOB) and nitrite oxidizing bacteria (NOB). Frequent background fluorescence made enumeration difficult, which required a more qualitative approach that utilized a relative abundance scale (FIG. 18).

Analysis of the digital FISH images using the relative abundance scale is provided in Table 11. These values show a strong presence of each major AOB and NOB in each WWTP. The extended aeration system appears to have the lowest abundance of AOB and NOB compared to the other WWTPs, although it appears to have a similar community structure to the 5-stage Bardenpho. The two MLE samples have similar NOB community structure; however the AOB appear to be inverted.

Attempts to alter the specific growth rate of the nitrifying bacteria by operation at extreme dissolved $CO_2$ concentrations of 12 and 103 mg/L produced interesting results. For optimal dissolved $CO_2$ concentration (12 mg/L), the AOB populations appear to be even, while the *Nitrosomonas* spp. appears to dominate the *Nitrosospira* spp. amongst the NOB. For the extreme suboptimal dissolved $CO_2$ concentration (103 mg/L), the *Nitrosomonas* spp. dominate the *Nitrosospira* spp. for the AOB and the NOB populations are higher but more even compared to the field sample. When compared to each other, the abundance of the *Nitrosomonas* spp. and *Nitrospirae* spp. appear to be similar, while *Nitorosospira* spp. are much higher for the reactor operating under optimal $CO_2$ concentration and the *Nitrobacter* spp. are much higher for the reactor operating under suboptimal $CO_2$ concentration.

A careful review of the dissolved $CO_2$ and pH values suggest that the 4-stage Bardenpho system should be operating at near optimal conditions for nitrification. In this system, the dominant AOB appears to be the *Nitrosospira* spp. and the dominant NOB appears to be the *Nitrospirae* phylum. In contrast, the 5-stage Bardenpho system has a higher abundance of *Nitrosomonas* spp., but the *Nitrosospira* spp. are still dominant amongst the NOB. The members of the phylum *Nitrospirae* are much lower relative to the 4-stage Bardenpho, while the *Nitrobacter* spp. are similar.

TABLE 11

FISH Analysis of five WWTP and lab-scale reactors operated at extreme dissolved $CO_2$ concentrations.

| | | | MLE #1 | | | | |
| --- | --- | --- | --- | --- | --- | --- | --- |
| | | EA | Field | 12 mg/L $CO_2$* | 103 mg/L $CO_2$* | MLE #2 | 4-Stage BP | 5-Stage BP |
| AOB | NSM156 *Nitrosomonas* spp., *Nitrosococcus mobilis* | 2.40 | 3.30 | 4.90 | 5.00 | 5.60 | 1.00 | 3.50 |
| | Nsv433 *Nitrosospira* spp. | 4.50 | 5.60 | 4.80 | 3.30 | 4.50 | 5.00 | 5.40 |
| NOB | NIT3 *Nitrobacter* spp. | 2.73 | 7.20 | 4.00 | 6.20 | 6.73 | 2.80 | 2.44 |
| | Ntspa717 most members of the phylum *Nitrospirae* | 1.90 | 5.80 | 6.00 | 6.80 | 5.50 | 5.00 | 1.70 |

*pH 7

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of optimizing the specific growth rate of nitrifying bacteria for treating wastewater in a system having an aeration basin, comprising:

obtaining wastewater containing ammonium;

establishing an optimal range for the soluble $CO_2$ concentration for the wastewater in the aeration basin;

where the optimal range for soluble $CO_2$ level for the aeration basin is established by the formula:

$$\mu = \mu_{max} \frac{[CO_2]}{\left([CO_2] + K_{CO2} + \frac{[CO_2]^2}{K_I}\right)}$$

wherein $\mu$ is specific growth rate of the nitrifying bacteria, $CO_2$ is a function of the $pCO_2$ of the air provided to the aeration basin, $K_{CO2}$ is Henry's constant for $CO_2$ and $K_I$ is the inhibition constant in mg/L;

measuring the concentration of soluble $CO_2$ for the wastewater in the aeration basin;

comparing the measured concentration of soluble $CO_2$ in the waste water in the aeration basin against the established optimal soluble $CO_2$ concentration; and adjusting the soluble $CO_2$ level in the aeration basin to match the established optimal soluble $CO_2$ concentration.

2. The method of claim 1, wherein optimal range for the soluble $CO_2$ concentration for the wastewater in the aeration basin is between about 5 mg/L and 15 mg/L.

3. The method of claim 1, wherein the soluble $CO_2$ concentration of the wastewater in the aeration basin is lowered by passing the internal recycle flow through a $CO_2$ stripping stage.

4. The method of claim 3, wherein the $CO_2$ stripping stage is selected from the group consisting of an air-stripping tower, a trickling filter, and conversion to a solid by addition of a base.

5. The method of claim 1, wherein the soluble $CO_2$ concentration of the wastewater in the aeration basin is lowered by passing the influent wastewater through a $CO_2$ stripping stage.

6. The method of claim 5, wherein the $CO_2$ stripping stage is selected from the group consisting of an air-stripping tower and a trickling filter.

7. The method of claim 1, further comprising adding $CO_2$ to the wastewater in the aeration basin.

8. The method of claim 1, further comprising:

establishing an optimal pH value for the denitrified wastewater in the aeration basin;

where the optimal pH value for the aeration basin is established by the formula:

$$\text{pH correction term} = \left( \frac{1}{[1 + \frac{[H^+]}{K1} + \frac{K2}{[H^+]}]} \right)$$

wherein K1 and K2 are constants specific for a bacterial species;

measuring the pH of the wastewater in the aeration basin;

comparing the measured pH in the waste water in the aeration tank against the optimal pH value; and adjusting the pH in the aeration basin to match the optimal pH value.

9. The method of claim 1, wherein the dissolved $CO_2$ concentration and pH are measured using a plurality of probes disposed throughout the aeration basin.

10. A method of optimizing the specific growth rate of nitrifying bacteria for treating wastewater in a system having an aeration basin, comprising:

obtaining wastewater containing ammonium;

establishing an optimal range for the soluble $CO_2$ concentration and pH for the denitrified wastewater in the aeration basin;

where the optimal range for soluble $CO_2$ level and pH for the aeration basin is established by the formula:

$$\mu obs = \mu_{max} \times \frac{[CO_2]}{\left( \frac{[CO_2] + K_S + \frac{[CO_2]^2}{K_I}}{CO_2 \text{ Term Max}} \right)} \times \frac{1}{\left( \frac{1 + \frac{[H^+]}{K_1} + \frac{K_2}{[H^+]}}{\text{pH Term Max}} \right)} - b$$

wherein µ is specific growth rate of the nitrifying bacteria, $CO_2$ is a function of the $pCO_2$ of the air provided to the aeration basin, $K_{CO2}$ is Henry's constant for $CO_2$, $K_I$ is the inhibition constant (mg/L), and K1 and K2 are constants specific for a bacterial species measuring the concentration of soluble $CO_2$ for the wastewater in the aeration basin;

comparing the measured concentration of soluble $CO_2$ in the waste water in the aeration basin against the established control value;

adjusting the soluble $CO_2$ level in the aeration basin to match the optimal soluble $CO_2$ level calculated;

measuring the pH of the wastewater in the aeration basin;

comparing the measured pH in the waste water in the aeration tank against the optimal pH value; and adjusting the pH in the aeration basin to match the optimal pH value.

11. The system of claim 10, wherein the $CO_2$ stripping stage is selected from the group consisting of an air-stripping tower and a trickling filter.

12. The method of claim 10, wherein optimal range for the soluble $CO_2$ concentration for the wastewater in the aeration basin is between about 5 mg/L and 15 mg/L.

13. The method of claim 10, wherein the soluble $CO_2$ concentration of the wastewater in the aeration basin is lowered by passing the internal recycle flow through a $CO_2$ stripping stage.

14. The method of claim 10, wherein the dissolved $CO_2$ concentration and pH are measured using a plurality of probes disposed throughout the aeration basin.

* * * * *